US012657115B2

(12) United States Patent　　　(10) Patent No.:　US 12,657,115 B2
Tsirkin　　　　　　　　　　　　　　(45) Date of Patent:　　Jun. 16, 2026

(54) EFFICIENT TESTING OF VERSIONED SOFTWARE SYSTEM BEHAVIOUR

(71) Applicant: Red Hat, Inc., Raleigh, NC (US)

(72) Inventor: Michael Tsirkin, Yokneam Illit (IL)

(73) Assignee: Red Hat, LLC, Raleigh, NC (US)

( * ) Notice: Subject to any disclaimer, the term of this patent is extended or adjusted under 35 U.S.C. 154(b) by 629 days.

(21) Appl. No.: 18/088,063

(22) Filed: Dec. 23, 2022

(65) Prior Publication Data

US 2024/0211381 A1　　Jun. 27, 2024

(51) Int. Cl.
*G06F 11/3668*　　　(2025.01)
(52) U.S. Cl.
CPC ........ *G06F 11/368* (2013.01); *G06F 11/3692* (2013.01)
(58) Field of Classification Search
CPC ...................................................... G06F 11/36
See application file for complete search history.

(56) References Cited

U.S. PATENT DOCUMENTS 9,355,018 B1 * 5/2016 Tsirkin .................. G06F 11/368
2014/0372983 A1 12/2014 Presley et al.

2020/0379880 A1 * 12/2020 Rodrigues Rosa Junior ...............
　　　　　　　　　　　　　　　　　　　　　 G06F 11/3616
2021/0056009 A1 * 2/2021 Gal ........................ G06F 11/362
2021/0255854 A1 * 8/2021 Coscarelli ................. G06F 8/71
2021/0263728 A1 8/2021 Farrier
2023/0077774 A1 * 3/2023 Ocariza ............... G06F 11/3688
　　　　　　　　　　　　　　　　　　　　　　　　　 717/122

FOREIGN PATENT DOCUMENTS

CN　　　　106933736　　　　7/2017

OTHER PUBLICATIONS

Couder, Christian, "Fighting regressions with git bisect", Nov. 8, 2009, 21 pages.

* cited by examiner

*Primary Examiner* — Duy Khuong T Nguyen
(74) *Attorney, Agent, or Firm* — Dority & Manning, P.A.

(57)　　　　　　　　ABSTRACT

Disclosed herein is technology to efficiently test versions. An example method may include: receiving a plurality of versions of one or more code objects, wherein each version of the plurality of versions has at least one ancestor or descendent version among the plurality of versions; determining a first number of versions in a testing round; selecting, from the plurality of versions, a first set of versions satisfying a weight-based criterion, wherein a number of the first set of versions equals the first number; testing the first set of versions; and updating the plurality of versions based on a result of testing the first set of versions.

18 Claims, 9 Drawing Sheets

COMPUTING DEVICE
120

CODE OBJECT COMPONENT
122

| OBJECT ACCESS MODULE 201 | OBJECT PREPARING MODULE 202 |

CHANGE SET IDENTIFICATION MODULE 203

TEST COMPONENT
124

| TEST DATA ACCESS MODULE 205 | TEST CONFIGURATION MODULE 206 |

| TESTING MODULE 207 | TEST DATA ANALYSIS MODULE 208 |

DATA STORE
208

TEST DATA 113
(e.g., Configuration Data, Execution Data, Results Data)

CHANGE SET 222
(e.g., Change Data Storage Structure)

PROCESSING DEVICE

CODE OBJECT
ACCESS MODULE
810

TEST
CONFIRGUATION
MODULE
820

TESTING MODULE
830

TEST DATA
ANALYSIS MODULE
840

MEMORY

CHANGE SET

TEST DATA

EFFICIENT TESTING OF VERSIONED SOFTWARE SYSTEM BEHAVIOUR

TECHNICAL FIELD

The present disclosure is generally related to version control systems, and is more specifically related to efficient testing of versioned software system behavior.

BACKGROUND

Version control systems store and manage multiple versions of an object. Each version may include one or more modifications that are absent from a prior or subsequent version. The version control system may organize the versions of the object using version identifiers and may enable particular versions to be accessed and tested.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
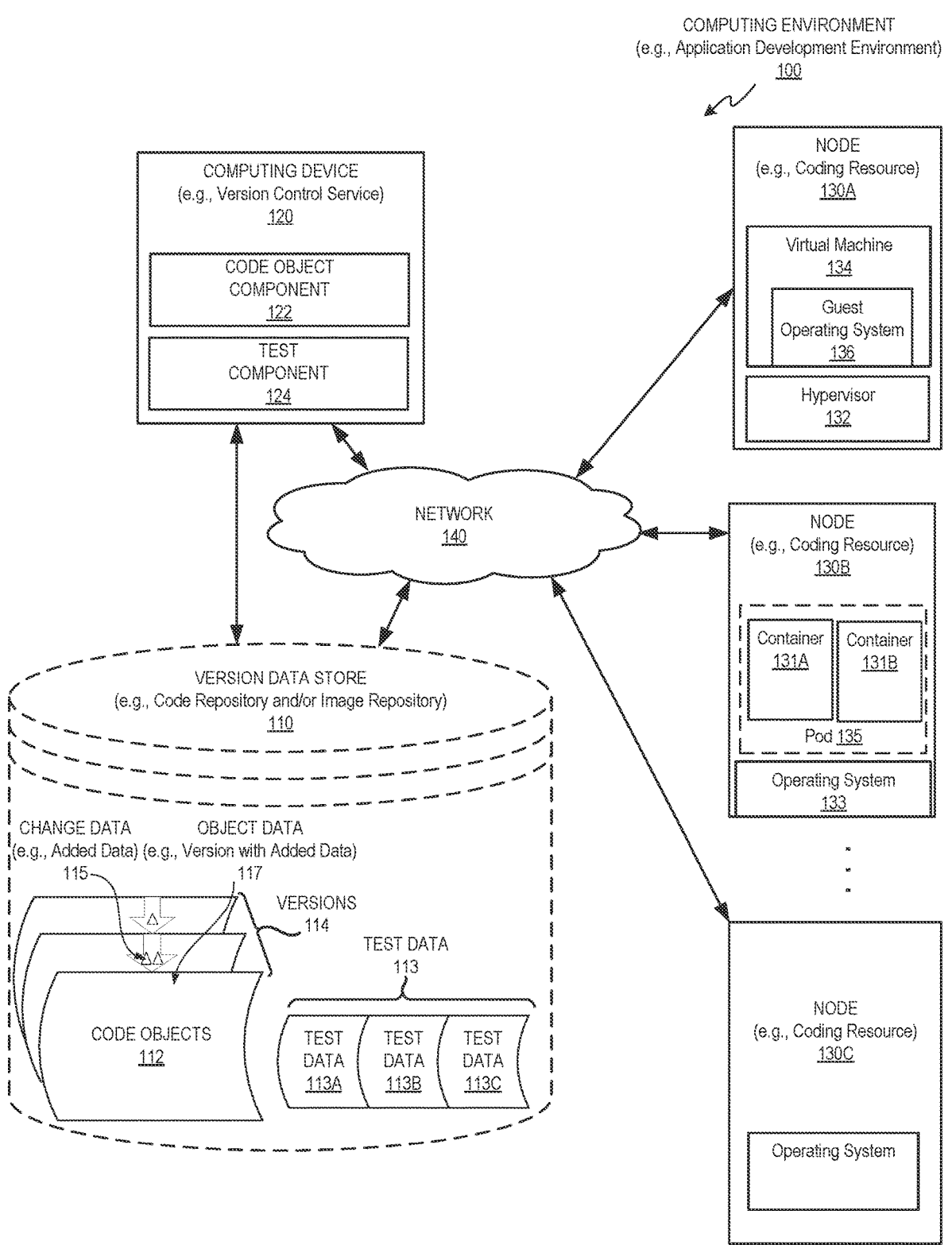
FIG. 1 depicts a high-level block diagram of an example computing environment, in accordance with one or more aspects of the present disclosure.

Modern software development is complex, and normally multiple developers work in parallel, for example, starting from the same version of a software and developing revised versions (e.g., fork commit). A new version that has made changes based on an existing version can be referred to as a descendant version, where the existing version can be referred to as an ancestor version. A version control system may be used to store multiple versions of a code object and enable a version to be accessed, changed, and tested in isolation from other versions of the code object. A code objects refers to a set of object data, where subsets of object data represent different versions. The changes made to one version may not affect other versions until the changes are integrated into the other versions (e.g., merge commit). Tests can be run on a particular version of the code object before, during, or after the integration. The tests are resource intensive and produce results that are often discarded after determining the test is satisfied.

A change to a previous stable version (i.e., the ancestor versions) can be detrimental or beneficial to the current version, and locating such change may be useful in in either remedying the defect introduced by the detrimental change or making a similar beneficial change to the current or later version. As the number of versions of code object increases, the ability to locate such change becomes more difficult. It thus has become increasingly important to provide effective ways to locate the version ("target version") that has introduced the change.

Aspects of the present disclosure address the above and other deficiencies by providing technology that enables efficient testing of multiple versions. In one embodiment, the technology implements a strategy for selecting certain versions to be tested in a testing round, such that testing would be more efficient. In one embodiment, the technology implements a strategy for parallel testing the versions in a testing round, such that testing would be more efficient. In one embodiment, the technology involves a combination of the selecting strategy and the testing strategy.

Specifically, a processing device can access multiple versions of code objects to find a target version. Each version can have at least one ancestor or descendent version among the multiple versions. The processing device may perform the test in rounds, such that all versions within a single testing round may be tested. In each testing round, the processing device can test several versions and based on the result of testing, the processing device can exclude some versions from consideration as the target version. Specifically, if a test result is positive (i.e., the test result does not exhibit a property that is searched for in a target version) for a version, that version and any ancestor versions of that version may be excluded from consideration; if a test result is negative for a version (i.e., the test result does exhibit a property that is searched for in a target version), any descendent versions of that version would be excluded from consideration. With the versions for consideration decrease after each testing round, the processing device repeats the testing rounds until a target version is found.

In some implementations, the processing device can determine, for each testing round, the number (T) of versions to be selected. The processing device can form a test group to which version to be selected will be added. The processing device can form a candidate pool from which the versions will be selected. For each testing round, the processing device can create a test group and a candidate pool and dynamically modify them through the selecting process. Initially, the candidate pool includes all versions for consideration, and the test group includes no versions. The processing device can select versions satisfying a weight-based criterion. For example, the processing device assigns each version in the candidate pool a respective weight (W). The weights assigned may reflect known information of various versions with respect to the target version, but if none such information is known, the weights can be assigned for other considerations, such as less computation. For example, the weight assigned to each version can be the number of direct ancestors of the respective version or based on a predetermined probability of a respective version being the target version, or the weight assigned to each version can be the same to each other (e.g., a constant). The system may then calculate the sum (S) of the weights of all versions in the candidate pool, and then calculate a value for version-selecting (V=S/(T+1)). The processing device may then find one or more versions that has the number of ancestors (including itself) close to the value (V). "The number close to the value" means that the number equals the value or the number is within a predefined threshold range of the value. Now, assuming that a first version is selected, the processing device can update the candidate pool and the test group by removing, from the candidate pool, the selected first version and ancestor versions of the selected first version, and adding the selected first version to the test group. With the updated candidate pool and updated test group, the processing device can continue selecting more versions satisfying the weight-based criterion until the number of selected versions reaches the predefined number (T). The processing device can then test the selected versions in a testing round, and, based on the test result, exclude certain versions as described above (i.e., excluding itself and its ancestors for the version with a positive test result, and excluding its descendants for the version with a negative test result) from consideration, and repeat the process until a target version is found.

In some implementations, the processing device can determine, for each testing round, the number (C) of versions to be tested. The processing device can also determine a quantity (R) for parallel testing. In some implementations, the number (C) and/or the quantity (R) can be determined based on historical data regarding testing time of each version, probability of testing rounds for finding a target version, testing cost, etc. The processing device can test R versions in parallel until the predefined number (C) of versions is tested. For example, when testing of one version of the initial R versions has been completed, while another version of the initial R versions is still being tested, the processing device may start testing a third version in parallel with the continued testing of another version. Upon determining that the number of completely tested versions reaches the predefined number (C), the processing device can, based on the test result of the tested versions, exclude certain versions as described above (i.e., excluding itself and its ancestors for the version with a positive test result, and excluding its descendants for the version with a negative test result) from consideration, and repeat the process until a target version is found.

The systems and methods described herein include technology that enhances the computing field of version control systems by providing selecting and testing strategies. Aspects of the present disclosure may enable changes to a code object to be tested in a more comprehensive and resource efficient manner. The technology disclosed herein may significantly decrease the time required to find a target version among a large number of versions.

FIG. 1 illustrates an exemplary computing environment 100 in which implementations of the disclosure may operate. Computing environment 100 may provide a development environment or a production environment and may enable a user to develop, configure, test, and deploy programs. In one example, computing environment 100 may be a web-based or non-web-based development platform and may be the same or similar to RedHat® OpenShift®, Microsoft® Azure Devops®, Oracle® Application Express® (APEX), other development platform, or a combination thereof. In another example, computing environment 100 may include separate tools that may or may not be arranged or organized as an Integrated Development Environment (IDE). In either example, computing environment 100 may include a version data store 110, a computing device 120, a plurality of nodes 130A-C, and a network 140. Version data store 110 may be a data store that stores one or more code objects 112 and each of the code objects 112 may include one or more versions 114. Version data store 110 may be referred to as a source code repository, a program repository, a package repository, an image repository, a document repository, other repository, or a combination thereof. Version data store 110 may include a single data storage device or multiple storage devices and may store data as one or more file system objects (e.g., files, directories), database objects (e.g., records), data blobs (e.g., continuous or non-continuous bit series), other data storage objects, or a combination thereof.

Version data store 110 may be a decentralized data store, a centralized data store, or a combination thereof. In the example shown in FIG. 1, version data store 110 may be a centralized content store that provides centralized access to code objects 112 and test data 113. In another example (not shown), version data store 110 may be a decentralized content store that distributes code objects 112 and test data 113 across one or more storage devices (e.g., multiple heterogeneous or homogenous nodes). In either example, the version data store 110 may provide access to one or more code objects 112.

Code objects 112 may be a set of object data, where subsets of object data represent different versions. For example, a first subset of object data represents an ancestor version of object data, and a second subset of object data represent a descendent version that includes a change of object data made based on the ancestor version. In some implementations, the code objects may be data structures that function as storage objects for object data. The storage objects may be in the form of file system objects (e.g., files, directories), database objects (e.g., records, tables, tuples, value pairs), other data storage structures, or a combination thereof. Each of code objects 112 may include object data that may be in a human readable form, a non-human readable form, or a combination thereof. Object data of a code object may or may not be separated into object content and object metadata. The object metadata may provide descriptive information about the object content and may include an object name (e.g., version identifier, object identifier), date (e.g., object creation date), user information (e.g., object or version creator, modifier), other descriptive information, or a combination thereof. In the example shown in FIG. 1, a version of the code object 112 may include object data 117.

Object data 117 of a code object may include source code data, executable code data, settings data, other data, or a combination thereof. The source code data may include a collection of words in a human-readable programming language that can be transformed from text (e.g., source code) into executable code for execution by a computing device. Source code data may be transformed by an assembler, compiler, linker, interpreter, other coding resource, or a combination thereof. The executable code data may include machine code that can be directly or indirectly executed by a processor of a computing device. The executable code data may include program data (e.g., executable or library), package data (e.g., an installation file), executable image data (e.g., virtual machine image, container image, or hard disk image), other data, or a combination thereof. The settings data may include customizable settings that effect source code or executable code. The settings data may be in the form of a file (e.g., settings file), a database (e.g., registry entry), other form, or a combination thereof. A code object may include any type of object data 117 and may be associated with test data 113.

Test data 113 may relate to one or more tests of a code object. A test may include one or more operations for assessing a code object. The test may be performed on content of the code object or on output of one or more transformations of the code object (e.g., an executable derived from source code). A test may be the same or similar to an assessment, an examination, a check, other term, or a combination thereof. A code object may be tested using one or more operations that include spell checking, syntax checking, compiling, linking, building, packaging, executing, running, launching, initiating, instantiating, deploying, other operation, or a combination thereof.

Test data 113 may be a data structure that stores and organizes output data of a test, input data of a test, other data, or a combination thereof. The data structure may include one or more data storage objects (e.g., file, database record) and may be associated with or correspond to multiple versions in version data store 110. The output data may be test results and may be generated by the computing device executing the test or the computing device managing the execution of the test. The output data may include execution data generated by the running the test and status data that is generated in view of the execution data. For example, the execution data may include a series of events that are generated and recorded (e.g., logged) during the test and the status data may indicate whether the events correspond to a pass or fail status. The status may function as a test summary of the execution data and may be incorporated into a report to indicate a portion of a test passed (e.g., satisfied a threshold), failed (e.g., failed to satisfy a threshold), or a combination thereof. The execution data and status data may be generated before, during, or after the test is run.

Test data 113 may also or alternatively include input data for the test. The input data of the test may include initiation data, configuration data, other data, or a combination thereof. The initiation data may include one or more instructions, commands, or parameters for initiating the test. The configuration data may indicate a test configuration for the test and may or may not include the code of the test. The code of the test may be executable code, scripted code, or other data of a test program or test harness. The test configuration may be based on settings of the computing device that executes the test and may include settings of the hardware (e.g., processor, memory, hard drive), settings of the programs (operating system, program versions, network addresses, user accounts), other settings, or a combination thereof. Test data 113 may be stored in version data store 110 and may be associated with a particular change set of code objects 112 as discussed in more detail in regard to FIG. 2.

Test data 113 may include data for different versions of the code object, as illustrated by test data 113A-C. Each of test data 113A-C may correspond to an execution of a test using different version of the code object. Each of the versions of the code object may be different but may contain an equivalent change set (e.g., same identical change set). For example, test data 113A may be for a test of a version of the code object on a bug fix branch, test data 113B may be for a test of a version of the code object on a team branch, and test data 113C may be for a test of a version of the code object on a main branch. In the example shown in FIG. 1, test data 113A-C may be combined (e.g., appended, concatenated, or merged). In other examples, each of test data 113A-C may be a different version of the test data and associated with the same change set. The different versions may each be kept separate or subsequent versions may include integrated content (e.g., third version includes content of the first two versions).

Versions 114 may be versions of the same code object or versions of one or more different code objects (e.g., a set of code objects). When multiple versions are associated with a common code object they may be referred to as related versions, corresponding versions, similar versions, associated versions, or other term. A version of a code object may include a change to object data that is not present in another version and multiple versions of the same code object may include a common change. In one example, each of versions 114 may be different and therefore absent any duplicate versions. In another example, one or more of the versions may be identical and have the same or similar object data 117. In either example, a different version of the code object may be generated in view of change data 115.

Change data 115 may include one or more change sets that can be applied to the code object to create a new version of the code object. Change data 115 may include changes to the content or metadata of the computing object. Change data 115 may include one or more instructions to perform the change (e.g., add, remove, modify) and the content affected by the change (e.g., new or old object content). Change data 115 may be applied to object data 117 to incorporate a change set into a new version of the code object. Change data 115 and object data 117 may be represented by object hashes and delta hashes, respectively. An object hash may represent object data of a particular version of a code object (e.g., output of a change) and a delta hash may represent change data of a particular change set that can be applied to a code object (e.g., the input change). The hashes may be particularly useful because they may enable a computing device 120 to more efficiently detect equivalent change sets and associate them with the same test data 113.

Computing device 120 may include one or more physical or virtual computing devices that have access to a version data store 110 and provide a version control service to one or more client devices (e.g., nodes 130A-C). Computing device 120 may be a rack mounted server, workstation, desktop computer, notebook computer, tablet computer, mobile phone, palm-sized computing devices, personal digital assistants (PDAs), etc. The version control service provided by computing device 120 may process client requests to access particular versions of code object 112. Computing device 120 may integrate with one or more other services that generate, access, instantiate, deploy, or configure code objects 112. The version control service may be the same or similar to a Revision Control System (RCS), a Software Configuration Management system (SCM), a Source Code Control System (SCCS), a Version Control System (VCS), other system, or a combination thereof. In one example, the version control service may be the same or similar to GIT, Apache Subversion® (SVN), Concurrent Versions System (CVS®), Perforce®, AccuRev®, ClearCase®, Rational Team Concert®, Visual SourceSafe®, other product, or a combination thereof.

In the example shown in FIG. 1, computing device 120 may include a code object component 122 and a test component 124. Code object component 122 may enable computing device 120 to access one or more versions of code objects 112 that include a particular change set. Code object component 122 may enable computing device to build, configure, deploy, instantiate, or other operation to enable the code objects 112 to be tested. Test component 124 may enable computing device 120 to initiate a test of code objects 112 and to store result of the test (e.g., test data 113) in version data store 110. Test component 124 may also enable computing device 120 to associate test data 113 with the change set being tested. The associating may involve linking test data 113 with a particular change set, a particular version of the code object, or a combination thereof. Components 122 and 124 are discussed in more detail in regard to FIG. 2 and may use one or more nodes 130A-C to perform the features discussed herein.

Nodes 130A-C and computing device 120 may access version data store 110 using content addressable storage, location addressable storage, or a combination thereof. Content addressable storage (CAS) may be data storage that stores and retrieves elements based on the content of the element and not the storage location of the element. The identifiers used to retrieve elements may be the same or similar to object hashes and may be a direct representation of the content of the version (e.g., object data). For example, a content addressable storage identifier may be a hash of one or more data blocks of the versioned code object and a modification of the content of the data blocks causes the hash to be recomputed. Content addressable storage may be a permanent-storage analogue to content-addressable memory and may be intended to store data that does not change or changes infrequently. When the stored elements remain unchanged, the content addressable storage may be referred to as Fixed Content Storage (FCS). In one example, version data store 110 may be a decentralized content addressable storage system that is the same or similar to the GIT distributed version control system and computing device 120 may access versions 114 using object hashes as identifiers.

Location addressable storage is different from content addressable storage and may store and retrieve versions 114 based on location identifiers as opposed to content identifiers. The location identifier may identify a particular location where the versioned code object is being stored and may be independent from the content of the stored version. Whether the content is changed after it is stored may have no effect on the location identifier used to retrieve the stored version. A location identifier may identify a file based on a file name or storage path (e.g., relative or absolute path) or may identify a record based on a key (e.g., object identifier (OID)) and neither the file name, storage path, or key may be affected when the content of the file or record is changed.

Nodes 130A-C may provide coding resources that may create, modify, configure, execute, apply, instantiate, or deploy code objects 112 of version data store 110. In one example, nodes 130A-C may be separate from version data store 110 and may submit requests to access a code object and receive one or more versions of the code object. In another example, one or more of the nodes 130A-C may be integrated with the version data store 110 and may provide computing resources (e.g., storage or processing power) to operate the version data store 110.

Although nodes 130A-C comprise a computing device, the term "node" may refer to a physical machine, a virtual machine, container, or a combination thereof. Nodes 130A-B may provide one or more levels of virtualization and node 130C may be absent these levels of virtualization. The one or more levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Node 130A node may provide hardware level virtualization by running a hypervisor 132 that provides hardware resources to one or more virtual machines 134. Hypervisor 132 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 134 executing a guest operating system 136.

Guest operating system 136 may be any program or combination of programs that are capable of managing computing resources of virtual machine 134 and/or node 130A. Guest operating system 136 may include a kernel comprising one or more kernel space programs (e.g., memory driver, network driver, file system driver) for interacting with virtual hardware devices or physical hardware devices. In one example, guest operating system 136 may include Linux®, Solaris®, Microsoft Windows®, Apple Mac®, other operating system, or a combination thereof.

Node 130B may be similar to node 130A and may provide operating system level virtualization by running a computer program that provides computing resources to one or more containers 131A-B. Operating system level virtualization may be implemented within the kernel of operating system 133 and may enable the existence of multiple isolated containers. In one example, operating system level virtualization may not require hardware support and may impose little to no overhead because programs within each of the containers may use the system calls of the same underlying operating system 133. This may enable node 130B to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 131A) on the resources of another container (e.g., container 131B).

The operating system level virtualization may provide a pool of computing resources that are accessible by container 131A and are isolated from one or more other containers (e.g., container 131B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 133 may include an operating system virtualizer that may provide containers 131A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 131A-B may refer to a resource-constrained process space of node 130C that can execute functionality of a program. Containers 131A-B may be referred to as a user-space instances, a virtualization engines (VE), or jails and may appear to a user as a standalone instance of the user space of operating system 133. Each of the containers 131A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 131A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 130B. In another example, the containers associated with a particular pod may be located on different nodes that are on the same or different physical machines.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
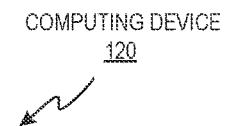
FIG. 2 depicts a block diagram of an example computing device with one or more components and modules for efficient testing of versioned software system behavior, in accordance with one or more aspects of the present disclosure.

FIG. 2 is a block diagram illustrating example components and modules that enable computing device 120 to efficiently test versions, in accordance with one or more aspects of the present disclosure. The components, modules, or features discussed in regard to computing device 120 may be consolidated to a single computing device or may be spread across one or more computing devices. The computing devices may be associated with a version control system service and may function as a client, a server, or a combination thereof. In the example shown in FIG. 2, computing device 120 may include a code object component 122 and a test component 124.

Code object component 122 may enable computing device 120 to access and prepare code objects for testing. In one example, code object component 122 may include an object access module 201, an object preparing module 202, and a change set identification module 203.

Object access module 201 may include features for accessing a code object in a version data store. The version data store may store a plurality of versions of the code object. Each version may include content that has been added or removed from a prior or subsequent version. The versions may be organized via a tree data structure (e.g., shown in FIGS. 4 and 6). Object access module 201 may enable computing device 120 to transmit requests to version data store and to receive one or more versions of the code object.

Object preparing module 202 may enable computing device 120 to prepare the code object to be tested. Preparing a code object may include one or more operations that involve compiling, linking, building, packaging, executing, running, launching, initiating, instantiating, deploying, other operation, or a combination thereof.

Change set identification module 202 may identify a change set 222 associated with the code object. Change set 222 may be represented by a change set identifier (e.g., delta hash) that uniquely identifies the change set. A single change set 222 may be incorporated into a plurality of versions and the change set identifier (e.g., delta hash) may be different from version identifiers (e.g., object hashes). In one example, a code object may include source code and the change set may include at least one of an addition, a removal, or an update of a line of text of the source code. The change set may include change data for updating the code object and may include both content data and position data. The content data may be the data (e.g., characters, data blocks) that are being updated (e.g., added, removed, replaced) and the position data may be the location in the code object that will be updated. The content data is included in at least one version of the code object but the position data is not included in any version of the code object (e.g., absent from all versions of the code object). In one example, test data 113 may be stored in version data store as one or more GIT notes that are associated to a particular change set (e.g., GIT commit). The change set may be associated with the test data in the version data store. Associating the change set with the test data may involve linking the test data to the change set. The code object may include a plurality of versions arranged on a plurality of branches and the change set may be incorporated into versions on at least two of the plurality of branches. The test data may be linked to the change set and associated with each version that incorporates the change set without being directly linked to the individual versions.

Test component 124 may enable computing device 120 to test the code object and store data of the test as a test data structure in the version data store. In one example, test component 124 may include a test data access module 205, a test configuration module 206, a testing module 207, and a test data analysis module 208.

Test data access module 205 may enable computing device 120 to access test data for the code object before, during, or after the test is executed. Test data 113 may be accessed from the computing device that executes the test or from a computing device that manages execution of the test. Test data access module 205 may communicate with the computing device or data storage device to retrieve configuration data for the test, execution data for the test, or a combination thereof. The configuration data (e.g., test initiation command, program settings) may function as input for the test and the execution data (e.g., system log) may function as output of the test. Test data access module 205 may also or alternatively access test data 113 from a data store. The data store may be the version data store or another data store coupled to the computing devices executing the test.

Test data access module 205 may store some or all of the test data 113 in the version data store. Test data 113 may be combined with test data from a prior or subsequent test execution on a different version of the code object. Combining the test data may involve appending, concatenating, merging, filtering, aggregating, summarizing, averaging, normalizing, or other operation. In one example, test data 113 may be stored as separate versions and each version of the test data may correspond to a particular execution of the test on the code object.

Test configuration module 204 may enable computing device 120 to determine and/or configure a selecting strategy and/or a testing strategy in a testing environment. Test configuration module 204 may also enable computing device 120 to select and/or configure a testing environment before, during, or after initiating the test. The test environment may include one or more computing devices (e.g., nodes 130A-C) and may be updated to incorporate a version of the code object being tested.

The computing device 120 may determine the selecting strategy by determining the number (T) of versions to be selected in a test group for testing the code object in a testing round, wherein the plurality of versions form a candidate pool in the testing round; selecting, from the candidate pool, a version satisfying a weight-based criterion; updating the candidate pool by removing, from the candidate pool, the selected version and ancestor versions of the selected version; and updating the test group by adding, to the test group, the selected version; and repeating the selecting and updating until the selected version in the test group has reaches the determined number of versions. The detail regarding the selecting strategy will be illustrated with FIGS. 3 and 4.

The computing device 120 may determine the testing strategy by determining a quantity (R) for parallel testing the code object; determine the number (C) of versions in a test group for testing the code object in a testing round; testing versions in the test group for the testing round, wherein testing is performed with R versions tested in parallel; determining a test count of versions that have been tested, and continues testing until the test count has reached the determined number of version. The detail regarding the testing strategy will be illustrated with FIGS. 5 and 6.

Testing module 207 may enable computing device 120 to initiate a test of the code object, pause and restart a test, and terminate a test. Initiating a test may involve executing an operation that begins testing the code object. Pausing and restarting a test may involve executing an operation that temporarily stop testing the code object and an operation that resume testing the code object. Terminating a test may involve executing an operation that ends testing the code object. The testing may be initiated, paused and restarted, or terminated by computing device 120 and may be executed on computing device 120, on another computing device (e.g., nodes 130A-C), or a combination thereof.

Test data analysis module 208 may enable computing device 120 to analyze test data before, during, or after test data 113 is stored in the version data store. Analyzing test data 113 may be advantageous because test data 113 may indicate the tests that have been performed on a change set 222 and the results of the tests. This may indicate which test configurations have been tested and any prior passes or failures. Based on this data, test data analysis module 208 may select a version that has not been tested or was previously tested with unfavorable results (e.g., failed or partially failed). In one example, test data analysis module 208 may detect that the change set is incorporated into a new version of the code object and analyze test data associated with the change set to determine an untested version and provide that to testing module 207 for a subsequent test. The detail of updating versions to be tested using the result of the tests will be illustrated in FIGS. 3-6.

Figure 3:
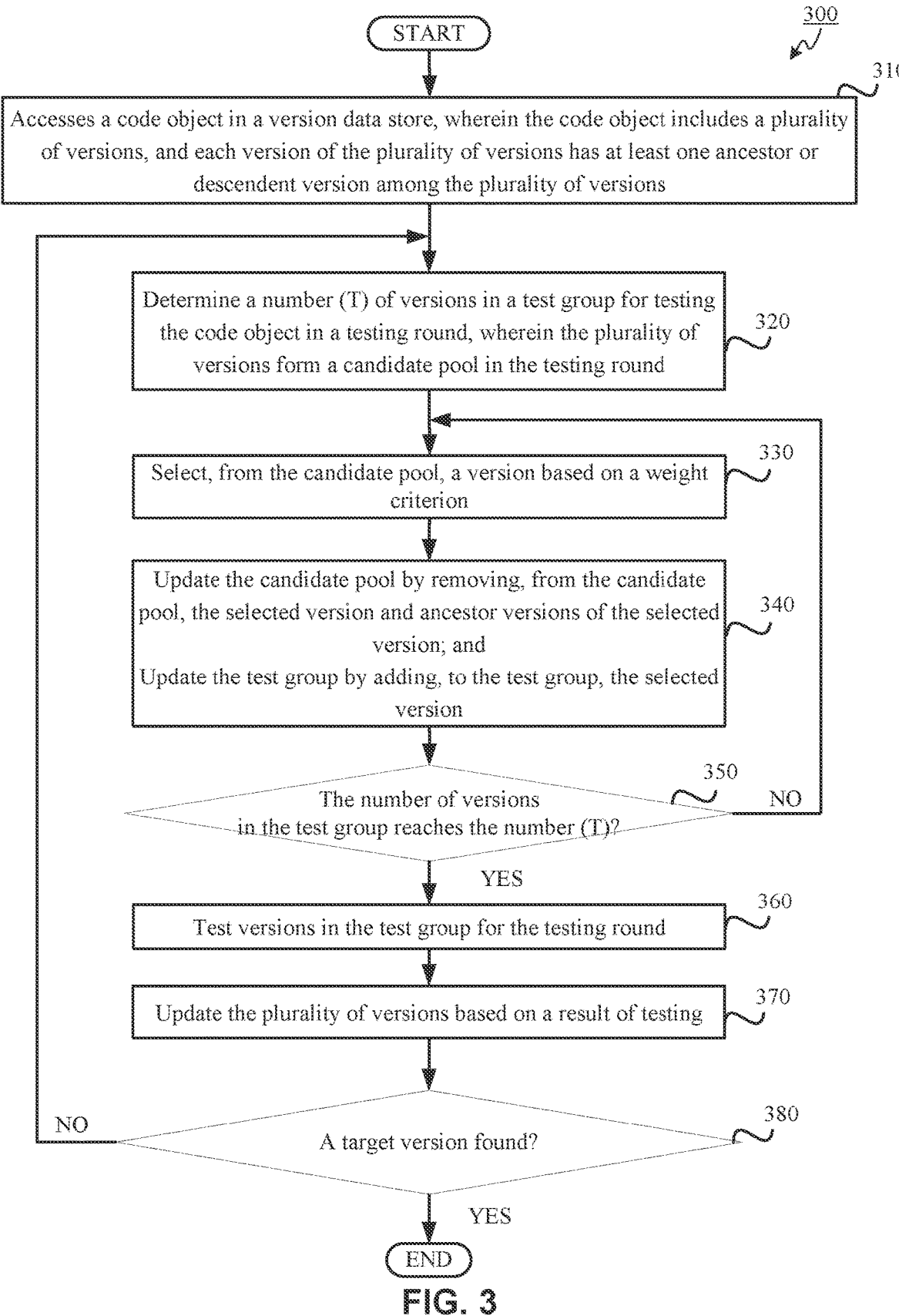
FIG. 3 depicts a flow diagram of an example method for smartly selecting versions for testing, in accordance with one or more aspects of the present disclosure.

FIG. 3 depicts a flow diagram of one illustrative example of a method 300 for efficiently testing a code object by smartly selecting a group of versions for testing in a round of testing, in accordance with one or more aspects of the present disclosure. Method 300 and each of its individual functions, routines, subroutines, or operations may be performed by one or more processors of a computing device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 122 and 124 as shown in FIGS. 1 and 2.

Method 300 may be performed by processing devices of a server device or a client device. At operation 310, the processing device accesses one or more code objects in a version data store, wherein the code objects include a set of versions, and each version has at least one ancestor or descendent version among the versions. Each version may include content that has been added or removed from a prior or subsequent version. The versions may be organized via a tree data structure (e.g., shown in FIG. 4). Initially, the set of versions are versions for consideration.

At operation 320, the processing device determines a number (T) of versions to be selected in a test group of testing the versions in a testing round, and the set of versions form a candidate pool. The number (T) reflects the number of versions that will be selected to add into the test group for a testing round. The candidate pool is where the versions will be selected from. In some implementations, the processing device may determine the number (T) randomly. In some implementations, the processing device may determine the number (T) according to the total number of versions in the candidate pool. In some implementations, the processing device may determine the number (T) based on historical test data, for example, a number used in a similar testing.

At operation 330, the processing device selects, from the candidate pool, a version based on a weight criterion. In some implementations, the processing device maintains a select count counting each time that one version is selected. The weight criterion may be related to a weight assigned to each version. In one example, the processing device assigns each version in the candidate pool a weight (W), calculates the sum (S) of the weights of all versions in the candidate pool, and then calculates a value for version-selecting (V=S/(T+1)). The processing device then selects a version that has the number of ancestors (including itself) that is close (for example, closest, among all versions) to the value (V). The weights assigned to each version can be the same or different. The weights assigned may reflect known information of various versions with respect to the target version, but if none such information is known, the weights can be assigned for other considerations, such as less computation. For example, the weight assigned to each version can be the number of direct ancestors of the respective version or based on a predetermined probability of a respective version being the target version, or the weight assigned to each version can be the same to each other (e.g., a constant). "The number close to the value" means that the number equals the value or the number is within a predefined threshold range of the value. For example, the number may be less or more than the value as long as the difference between the number and the value is below than a threshold value.

At operation 340, the processing device updates the candidate pool by removing, from the candidate pool, the selected version and its ancestor versions and updates the test group by adding, to the test group, the selected version. In some implementations, the processing device removes, from the versions for consideration that is originally included in the candidate pool, the selected version and its ancestor versions so that the candidate pool has an updated set of the versions, and adds the selected version to the test group. In some implementations, the processing device removes, from the versions for consideration that has been updated from a testing result, the selected version and its ancestor versions so that the candidate pool has an updated set of the versions, and adds the selected version to the test group.

At operation 350, the processing device determines whether the number of versions that have been selected has reached to the number (T) determined at operation 320. Responsive to determining that the number of versions that have been selected has not reached to the number (T) determined at operation 320, the processing device proceeds to operations 330 and 340 for selecting more versions and updating the candidate pool and the test group, i.e., continues selecting versions until the test group has reached the determined number (T) of versions.

At operation 360, responsive to determining that the number of versions that have been selected has reached to the number (T) determined at operation 320, the processing device tests versions in the test group in the testing round. Testing a version may include determining whether the version includes a target property (detrimental or beneficial), which can be caused, for example, in a form of an addition, a removal, or an update of a line of text of the source code. The target property may include data changed to at least one version of the code object, and the target property may be associated with position data that indicates a location of the change in the code object. A test result of a version may include a positive result or a negative result. A positive result refers to the tested version passing the test, and passing the test may mean that the tested version does not include a target property. A negative result refers to the tested version failing the test, and failing the test may mean that the tested version does include a target property.

At operation 370, the processing device updates the versions for consideration based on a result of testing performed at operation 360. In some implementations, responsive to a positive result of testing a version, the processing device removes, from the versions for consideration, the version and its ancestor versions. In some implementations, responsive to a negative result of testing a version, the processing device removes, from the versions for consideration, descendent versions of the version. In some implementations, responsive to a positive result of testing a first version and a negative result of testing a second version, the processing device removes, from the versions for consideration, the first version and ancestor versions of the first versions, and descendent versions of the second version. Here, some versions can be removed more than once, which would not affect the result since removing any version that has been removed is the same as removing none. As such, the processing device updates the versions for consideration by removing certain versions based on the test result from the versions for consideration.

At operation 380, the processing device determines whether a target version has been found. For example, after updating the versions for consideration based on a result of testing, the processing device determines that there is only one version remaining and this remaining version has been tested as negative, and thus determines the target version has been found. In another example, after updating the versions for consideration based on a result of testing, the processing device determines that there is more than one version remaining, and thus determines the target version has not been found. Responsive to determining that the target version has been found, the processing device can terminate the process.

Responsive to determining that the target version has not been found, the processing device proceeds to operations 320 to start a new round of testing. A round of testing may include operations 320, 330, 340, 350, 360, 370. In some implementations, the processing device may skip the operation 320 for the new round, for example, in the case that the number of version that is determined previously can be used in the new round of testing.

Figure 4:
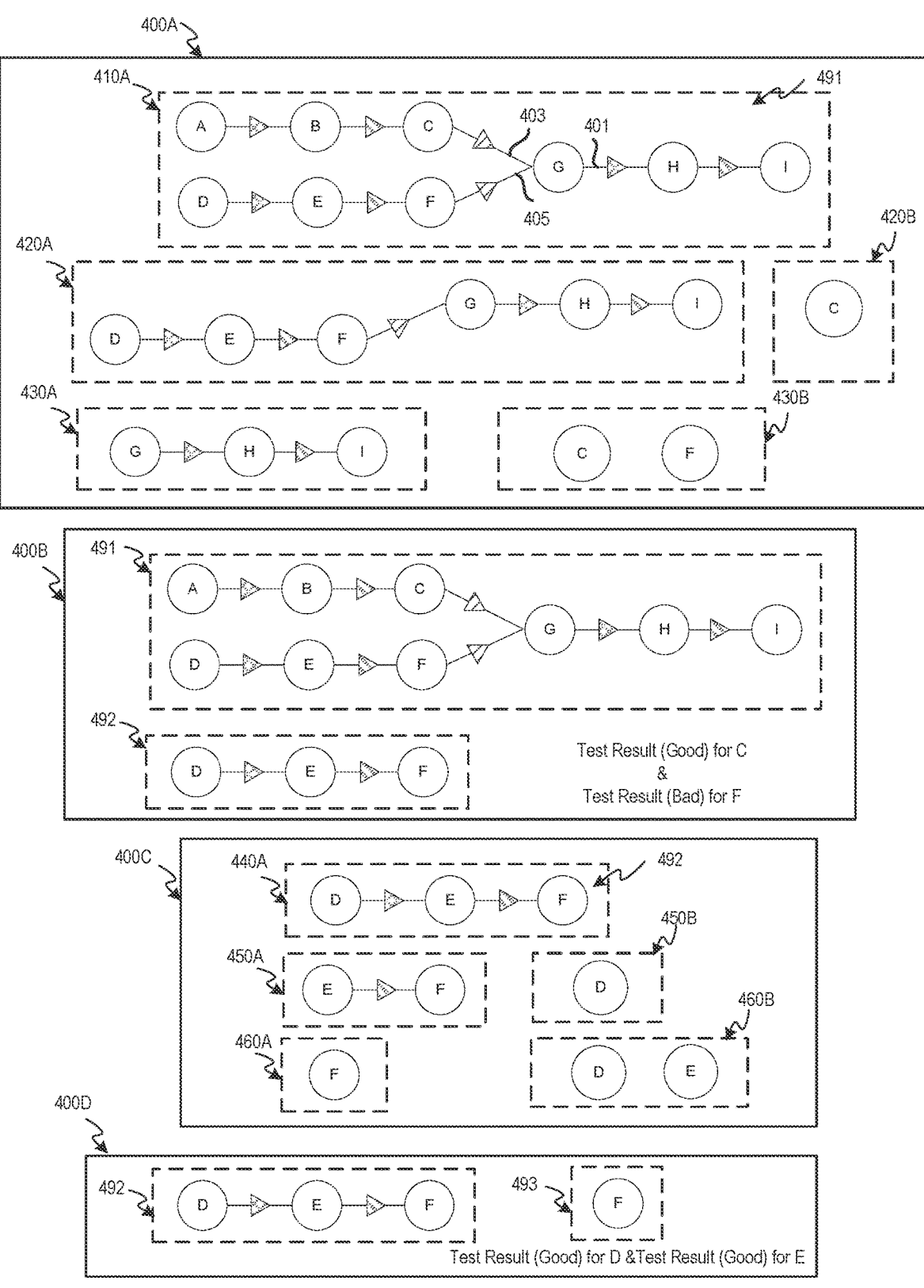
FIG. 4 depicts a block diagram of an example to perform the example method 300 with a version tree that includes multiple versions, in accordance with one or more aspects of the present disclosure.

FIG. 4 is a line drawing illustrating an example for efficiently testing multiple versions of one or more code objects according to method 300 of FIG. 3. The block 400A reflects selecting versions to form a first test group in a first test round, and the block 400B reflects testing the versions selected into the first test group in the first test round. The block 400C reflects selecting versions to form a second test group in a second test round, and the block 400D reflects testing the versions selected into the second test group in the second test round.

FIG. 4 provides an example of using the method 300 starting with a tree data structure 491. Tree data structure 491 may be represented as a version tree that includes a set of nodes associated with triangles. The nodes may represent versions (e.g., versions A-I) and the triangles may represent changes between the versions. Changes between versions of tree data structure 491 may be integrated on a source (i.e., ancestor) version to a destination (i.e., descendent) version. The integration may involve creating a new version on the destination version that will include changes from the source version. The integration may involve one or more operations that include copying, moving, merging, removing, adding, other operation, or a combination thereof.

In one example, tree data structure 491 may represent versions of a single code object. In another example, tree data structure 491 may represent versions of a set of code objects and each version may represent the set at a point in time. A version of a set of code objects may correspond to a respective version of each code object in the set. The size of the set may expand or contract in subsequent versions of the set. In one example, the tree data structure 491 may represent a program and an initial version of the program may have an initial set of source code files and the quantity of files may increase or decrease in subsequent versions of the program. In another example, the tree data structure 491 may represent versions of a configuration for one or more computing devices (e.g., a set of deployed devices). An initial version of the configuration may correspond to a set of programs on a device or a set of executable images (e.g., different appliances) and the number of programs or executable images may increase or decrease in a subsequent version of the configuration. As used throughout this application, the term "code object" may be interpreted to include a "set of code objects" (e.g., one or more code objects) as discussed above and in either example, tree data structure 491 may organize the versions using one or more branches (e.g., branches 401, 403, 405).

Branches (e.g., branches 401, 403, 405) may enable code objects to be changed in parallel by isolating changes on a first branch from changes on a second branch. Each of the branches may be the same or similar to a stream and may function as a parent branch, a child branch, or a combination thereof. A branch may be specific to a set of one or more topics (e.g., fixes or enhancements), users (e.g., developers, IT administrators), locations (e.g., geographically separated sites), entities (e.g., teams or companies), other separation, or a combination thereof. Branch may be referred to as a main branch or trunk branch because it may be absent a parent branch and may not be based on any other branch. In tree data structure 491, branches 403 and 405 may both be parent (i.e., ancestor) branches of child (i.e., descendent) branch 401 and each may be associated with a particular user (e.g., developer A and B respectively). Each branch may branch out from any point on another branch and multiple branches may branch from the same point or different points. The point may be on the parent branch and may be a particular version.

When comparing versions or changes in the tree data structure, computing device 120 may determine and analyze version relationship data. Version relationship data may represent the relationship of a version to one or more branches (e.g., child branch, parent branch, grandparent branch). The version relationship data may be derived by computing device 120 from tree data structure 491 and be stored in a data store 208 or version data store 110.

Now starting with the computing device 120 accessing the tree data structure 491 in a data store 208 or version data store 110, the tree data structure 491 includes versions A-I. The computing device 120 determines the number (T) of versions in the first test group for testing versions A-I in the first testing round, for example, to be 2. The computing device 120 uses versions A-I to form the first candidate pool 410A in the first testing round. The computing device 120 selects, from the first candidate pool 410A, a version based on a weight criterion. In one example, the computing device 120 assigns each versions A-I in the first candidate pool 410A a weight (W), for example, to be 1, calculates the sum (S) of the weights of all versions in the candidate pool, for example, to be 9, and then calculate a value (V=S/(T+1)) to be 3. The computing device 120 then finds a version that has the number of ancestors (including itself) close to the value (V), for example, 3. For example, the computing device 120 finds version C that has the number of ancestors (including itself) to be 3, and selects version C since the number 3 equals the value 3. After selecting version C, the computing device 120 removes, from the first candidate pool 410A, version C and its ancestors, i.e., versions A and B to from a new first candidate pool 420A, and adds version C to the first test group 420B. The computing device 120 then checks whether the number of versions that have been selected to add to the first test group has reached the number (T), for example, 2. Since now the first test group 420B has one version, i.e., version C, the computing device 120 determines that the number (T) has not been reached. The computing device 120 then continues to select one or more versions.

The computing device 120 selects, from the first candidate pool 420A, a version based on the same weight criterion described above. That is, the computing device 120 finds a version that has the number of ancestors (including itself) close to the value (V), for example, 3. For example, the computing device 120 finds version F that has the number of ancestors (including itself) to be 3, and selects version F. After selecting version F, the computing device 120 removes, from the first candidate pool 420A, version F and its ancestors, i.e., versions D and E to from a new first candidate pool 430A, and adds version F to the first test group 430B. The computing device 120 then checks whether the number of versions that have been selected to add to the first test group has reached the number (T), for example, 2. Since now the first test group 430B has two version, i.e., versions C and F, the computing device 120 determines that the number (T) has been reached.

After determining the first test group 430 B in block 400A, the computing device 120 tests the versions (i.e., versions C and F) included in the first test group and update the versions remining for testing, shown in block 400B. The testing of versions C and F may be done sequentially, in parallel, or a combination thereof. In some implementations, testing of versions C and F may be performed using method 500 described later. In some implementations, by storing the test data in the version data store, it may be accessible before performing a subsequent test and may enable the test execution device to use a different test configuration so that the repeated tests are more comprehensive (e.g., cover more variations).

The versions before testing versions C and F includes versions A-I shown in tree data structure 491, and the versions after testing versions C and F includes versions D-F shown in tree data structure 492. Specifically, in block 400B, assuming the test result for version C is positive and the test result for version F is negative, version C and its ancestor, i.e., versions A and B, would be taken out from further testing, and descendants of version F, i.e., versions G, H, and I would be taken out from further testing. As such, the tree data structure 492 includes versions D-F, which will be used for finding a target version.

Now as the tree data structure 492 shrinks, the computing device 120 will continue a second round of testing to find a target version. The computing device 120 may continue a second round of testing based on a determination that the target version has not been found. The second round may start with selecting versions as shown in block 400C. The computing device 120 determines the number (T) of versions in the second test group for testing versions A-I in the second testing round, for example, to be 2. In some implementations, the computing device 120 may use the number (T) determined previously, such as determined in the first round of testing. The computing device 120 uses versions D-F to form the second candidate pool 440A in the second testing round. The computing device 120 selects, from the second candidate pool 440A, a version based on a weight criterion. In one example, the computing device 120 assigns each versions D-F in the second candidate pool 440A a weight (W), for example, to be 1, calculates the sum (S) of the weights of all versions in the candidate pool, for example, to be 3, and then calculate a value (V=S/(T+1)) to be 1. The computing device 120 then finds a version that has the number of ancestors (including itself) close to the value (V), for example, 1. For example, the computing device 120 finds version D that has the number of ancestors (including itself) to be 1, and selects version D because the number 1 equals the value 1. After selecting version D, the computing device 120 removes, from the second candidate pool 440A, version D and its ancestors, i.e., none, to from a new second candidate pool 450A, and adds version D to the second test group 450B. The computing device 120 then checks whether the number of versions that have been selected to add to the second test group has reached the number (T), for example, 1. Since now the second test group 450B has one version, i.e., version D, the computing device 120 determines that the number (T) has not been reached. The computing device 120 then continues to select one or more versions.

The computing device 120 selects, from the second candidate pool 450A, a version based on the same weight criterion described above. That is, the computing device 120 finds a version that has the number of ancestors (including itself) close to the value (V), for example, 1. For example, the computing device 120 finds version E that has the number of ancestors (including itself) to be 1, and selects version E. After selecting version E, the computing device 120 removes, from the second candidate pool 450A, version E and its ancestors, i.e., none, to from a new second candidate pool 460A, and adds version E to the second test group 460B. The computing device 120 then checks whether the number of versions that have been selected to add to the second test group has reached the number (T), for example, 2. Since now the second test group 460B has two version, i.e., versions D and E, the computing device 120 determines that the number (T) has been reached.

After determining the second test group 460B in block 400C, the computing device 120 tests the versions (i.e., versions D and E) included in the second test group and update the versions remining for testing, shown in block 400D. The testing of versions D and E may be done sequentially, in parallel, or a combination thereof. In some implementations, testing of versions C and F may be performed using method 500 described later. In some implementations, by storing the test data in the version data store, it may be accessible before performing a subsequent test and may enable the test execution device to use a different test configuration so that the repeated tests are more comprehensive (e.g., cover more variations).

The versions before testing versions D and E includes versions D-F shown in tree data structure 492, and the versions after testing versions D and E includes versions E and F shown in tree data structure 493. Specifically, in block 400D, assuming the test result for version D is positive and the test result for version E is positive, version D and its ancestor, i.e., none, would be taken out from further testing, and version E and its ancestor, i.e., none, would be taken out from further testing. As such, the tree data structure 493 includes version F, and the computing device 120 may determine that the target version has been found. Here, since only one version, i.e., version F is remaining and a test result for version F is already known as negative, the computing device 120 determines the target version has been found.

Figure 5:
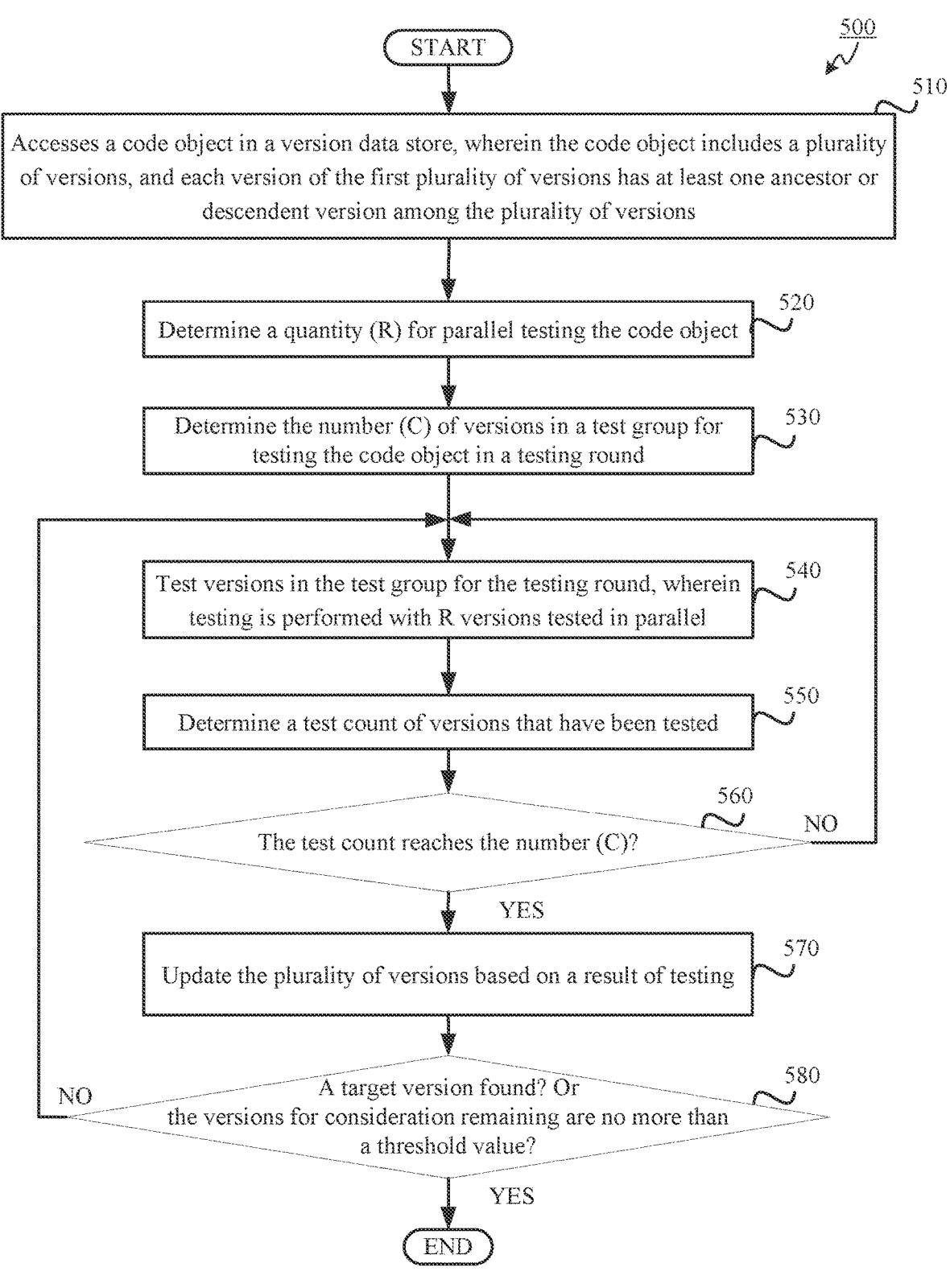
FIG. 5 depicts a flow diagram of an example method for efficiently testing versions, in accordance with one or more aspects of the present disclosure.

FIG. 5 depicts a flow diagram of one illustrative example of a method 500 for efficiently testing a code object in a round of testing, in accordance with one or more aspects of the present disclosure. Method 500 and each of its individual functions, routines, subroutines, or operations may be performed by one or more processors of a computing device executing the method. In certain implementations, method 500 may be performed by a single computing device. Alternatively, method 500 may be performed by two or more computing devices, each computing device executing one or more individual functions, routines, subroutines, or operations of the method. In one implementation, method 500 may be performed by components 122 and 124 as shown in FIGS. 1 and 2.

Method 500 may be performed by processing devices of a server device or a client device. At operation 510, the processing device accesses one or more code objects in a version data store, wherein the code objects include a set of versions, and each version of the plurality of versions has at least one ancestor or descendent version among the plurality of versions. The operation 510 may be same as or similar to the operation 310. Initially, the set of versions are versions for consideration.

At operation 520, the processing device determines a quantity (R) of versions to be tested in parallel. The quantity (R) reflects the number of versions of which testing will be tested simultaneously. The processing device determines the quantity (R) according to the number of testing rounds, testing time, computing costs, and/or combination thereof.

In some implementations, the processing device determines the quantity (R) based on the ratio of the number of testing rounds of worst scenario to best scenario. For example, the processing device accesses the version data store for test data of a certain set of versions, and based on the historical test data, determines that it takes N rounds to find a target in the worst scenario and M rounds to find a target in the best scenario. The processing device may determine the quantity (R) as the ratio of N/M. In another example, the processing device accesses the version data store for test data of a certain set of versions, and based on the historical test data, determines that it takes O rounds to find a target in 20% cases and P rounds to find a target in 80% cases. The processing device may determine the quantity (R) as the ratio of O/P. In yet another example, the processing device accesses the version data store for test data of a certain set of versions, and based on the historical test data, determines that it takes at least Q rounds to find a target. The processing device may determine the quantity (R) as the ratio of Q.

In some implementations, the processing device determines the quantity (R) based on testing time of sets of versions. For example, the processing device accesses the version data store for test data of a certain set of versions, and based on the historical test data, determines that for a certain type of versions in the set, the testing time for each version for that type is within a range. The processing device may determine the quantity (R) to be the number of versions of that type. In another example, the processing device may determine the total number of versions to be tested, and based on the historical test data obtained, estimates the total testing time for using a traditional bisecting method. The processing device may determine the quantity (R) based on the total number of versions and the total testing time, for example, determine the quantity (R) to be the number of versions that are estimated to have a testing time close to the average testing time (i.e., the total testing time divided by the total number of versions).

In some implementations, the processing device determines the quantity (R) based on the computational complexity of testing the versions. The processing device may determine the quantity (R) to be the number of versions with similar complexity.

At operation 530, the processing device determines the number (C) of versions to be tested in a test group of testing the versions in a testing round. The number (C) reflects the number of versions that will be tested completely in a testing round. The processing device determines the number (C) according to testing time. For example, the processing device determines that the testing time for certain versions are close to each other, e.g., within a range. The processing device may determine the number (C) to be the number of the versions of which the testing time is within a threshold range value. In another example, the processing device may set a time limit for testing in a round and determines the number (C) to be the number of versions that have been completely tested when the time limit is reached.

At operation 540, the processing device tests versions in the test group for the testing round, wherein testing is performed with R versions tested in parallel. Testing a version may include determining whether the version includes a target property (detrimental or beneficial), for example, in a form of an addition, a removal, or an update of a line of text of the source code. The target property may include data changed to at least one version of the code object, and the target property may be associated with position data that indicates a location of the change in the code object. A test result of a version may include a positive result or a negative result. A positive result refers to the tested version passing the test, and passing the test may mean that the tested version does not include a target property. A negative result refers to the tested version failing the test, and failing the test may mean that the tested version does include a target property.

In some implementations, the processing device randomly selects versions for testing in the testing round. In some implementations, the processing device selects versions for testing in a testing round according to method 300. The processing device selects versions from versions for consideration, which can be updated according to testing results described below.

In some implementations, one or more versions among R versions that have been started simultaneously can be completed faster than other versions among R versions. In some implementations, testing a first version among R versions has been completed, while testing a second version has not been completed, in such case, the processing device may start testing a third version (in place of first version in the paralleled processes) while continuing testing the second version. In some implementations, testing a first version among R versions has been completed, testing a second version has not been completed, testing a third version in place of the first version has been started and completed before completion of testing the second version, in such case, the processing device may start a fourth version (in place of third version in the paralleled processes) while continuing testing the second version.

At operation 550, the processing device determines a test count of versions that have been tested.

At operation 560, the processing device determines whether the test count has reached to the number (C) determined at operation 530. Responsive to determining that the test count has not reached the number (C), the processing device proceeds to operations 540 and 550 for testing more versions until the completed version has reached the determined number (C) of versions.

At operation 570, responsive to determining that the test count has reached the number (C) determined at operation 530, the processing device updates the versions for consideration based on a result of testing performed at operation 540. In some implementations, responsive to a positive result of testing a first version, the processing device removes, from the versions for consideration, the first version and its ancestor versions. In some implementations, responsive to a negative result of testing a second version, the processing device removes, from the versions for consideration, descendent versions of the second version. As such, the processing device updates the versions for consideration by removing certain versions based on the test result from the versions for consideration.

At operation 580, the processing device determines whether a target version has been found. For example, after updating the versions for consideration based on a result of testing, the processing device determines that there in only one version remaining and this remaining version has been tested as negative, and thus determines the target version has been found. Responsive to determining that the target version has been found, the processing device can terminate the process.

Responsive to determining that the target version has not been found, the processing device proceeds to operations 540 to start a new round of testing. A round of testing may include operations 540, 550, 560, 570. In some implementations, the processing device may include the operations 520 and 530 for the new round, for example, in the case that the quantity (R) for parallel testing and the number (C) of version need to be redetermined for a new round of testing.

In some implementations, at operation 580, the processing device determines whether the number of versions remaining is less than a predetermined threshold value. Responsive to determining that the versions for consideration remaining is less than a threshold value, the processing device can test the versions for consideration remaining in a different testing strategy. For example, when the versions for consideration remaining is in a small amount (e.g., 2), the processing device can test all remining versions to determine a target version. In another example, the processing device can select one or more versions in the remaining versions to test first, and based on the test result, determine a target version.

Figure 6:
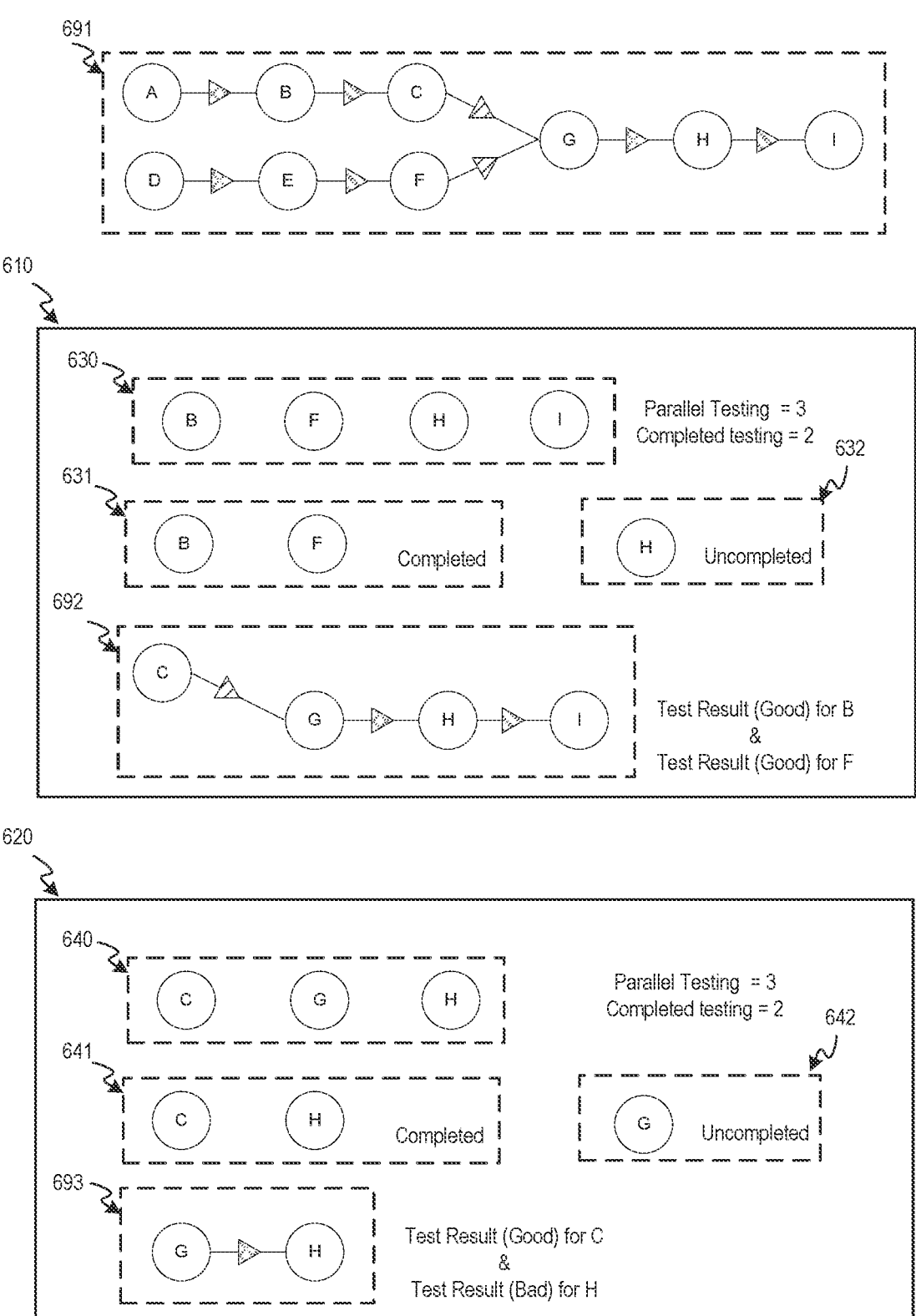
FIG. 6 depicts a block diagram of an example to perform the example method 500 with a version tree that includes multiple versions, in accordance with one or more aspects of the present disclosure.

FIG. 6 is a line drawing illustrating an example for efficiently testing multiple versions of one or more code objects in parallel according to method 500 of FIG. 5. The block 610 reflects testing the versions in the first test round. The block 620 reflects testing the versions in the second test round. FIG. 6 provides an example of using the method 500 starting with a tree data structure 691. The tree data structure 691 may be the same as or similar to the tree data structure 491 illustrated in FIG. 4.

Now starting with the computing device 120 accessing the tree data structure 691 in a data store 208 or version data store 110, the tree data structure 691 includes versions A-I. The computing device 120 determines the quantity (R) for parallel testing, for example, to be 3. The computing device 120 determines the number (C) of versions for testing versions A-I in the first testing round, for example, to be 2. For example, the computing device 120 randomly selects, from the versions A-I, a testing group 630 including versions for testing in the first round, i.e., versions B, F, H and I. The computing device 120 starts testing versions B, F, and H in parallel. Assuming after a first specific time period, version B has been completed while versions F and H have not been completed, the computing device 120 increments the test count to 1 when version B has been completed. The computing device 120 may determine whether the test count has reached the number (C), for example, 2. Since the test count 1 has not reached the number (C) 2 at this time, the computing device 120 continues testing. Assuming after a second specific time period, versions B and F have been completed while version H has not been completed, the computing device 120 increments the test count to 2 when version F has been completed. The computing device 120 may determine whether the test count has reached the number (C), for example, 2. Since the test count 2 has reached the number (C) 2 at this time, the computing device 120 can update versions A-I based on the test results of versions B and F.

For example, assuming that the test result for version B is positive and the test result for version F is positive, version B and its ancestor, i.e., version A, would be taken out from further testing, and version F and its ancestor, i.e., versions D and E, would be taken out from further testing. As such, the tree data structure 692 includes versions C and G-I, which will be used for finding a target version.

Now as the tree data structure 492 shrinks, the computing device 120 will continue a second round of testing to find a target version. The computing device 120 may continue a second round of testing based on a determination that the target version has not been found. The second round may start with selecting versions as shown in block 620. The computing device 120 uses the determined quantity (R) for parallel testing, e.g., 3. The computing device 120 uses the determined number (C) of versions, e.g., 2, for the second testing round. For example, the computing device 120 randomly selects, from the versions C and G-I, a testing group 640 including versions for testing in the second round, i.e., versions C, G, and H. The computing device 120 starts testing versions C, G, and H in parallel. Since version H has been tested in the first testing round, the computing device 120 may continue testing version H when the first testing round ends. In some implementations, when the first testing round ends, all ongoing testing pause or stop.

Assuming after a first specific time period, version H has been completed while versions G and C have not been completed, the computing device 120 increments the test count to 1 when version H has been completed. The computing device 120 may determine whether the test count has reached the number (C), for example, 2. Since the test count 1 has not reached the number (C) 2 at this time, the computing device 120 continues testing. Assuming after a second specific time period, versions C and H have been completed while version G has not been completed, the computing device 120 increments the test count to 2 when version H has been completed. The computing device 120 may determine whether the test count has reached the number (C), for example, 2. Since the test count 2 has reached the number (C) 2 at this time, the computing device 120 can update versions C and G-I based on the test results of versions C and H.

For example, assuming that the test result for version C is positive and the test result for version H is negative, version C and its ancestor, i.e., none, would be taken out from further testing, and the descendent of version H, i.e., version I, would be taken out from further testing. As such, the tree data structure 692 includes versions G and H, which will be used for finding a target version.

Here, since two versions, i.e., versions G and F are remaining and a test result for version H is already known as negative, the computing device 120 may determine that a target version has not been found. The computing device 120 may determine whether the versions for consideration remaining for testing is no more than a threshold value, for example, 2. Since the number of versions remaining for testing is no more than 2, the computing device 120 may not continue the parallel testing, but select one version, i.e., version G for testing. If the test result for version G is positive, the computing device 120 may determine the target version to be version H. If the test result for version G is negative, the computing device 120 may determine the target version to be version G.

Figure 7:
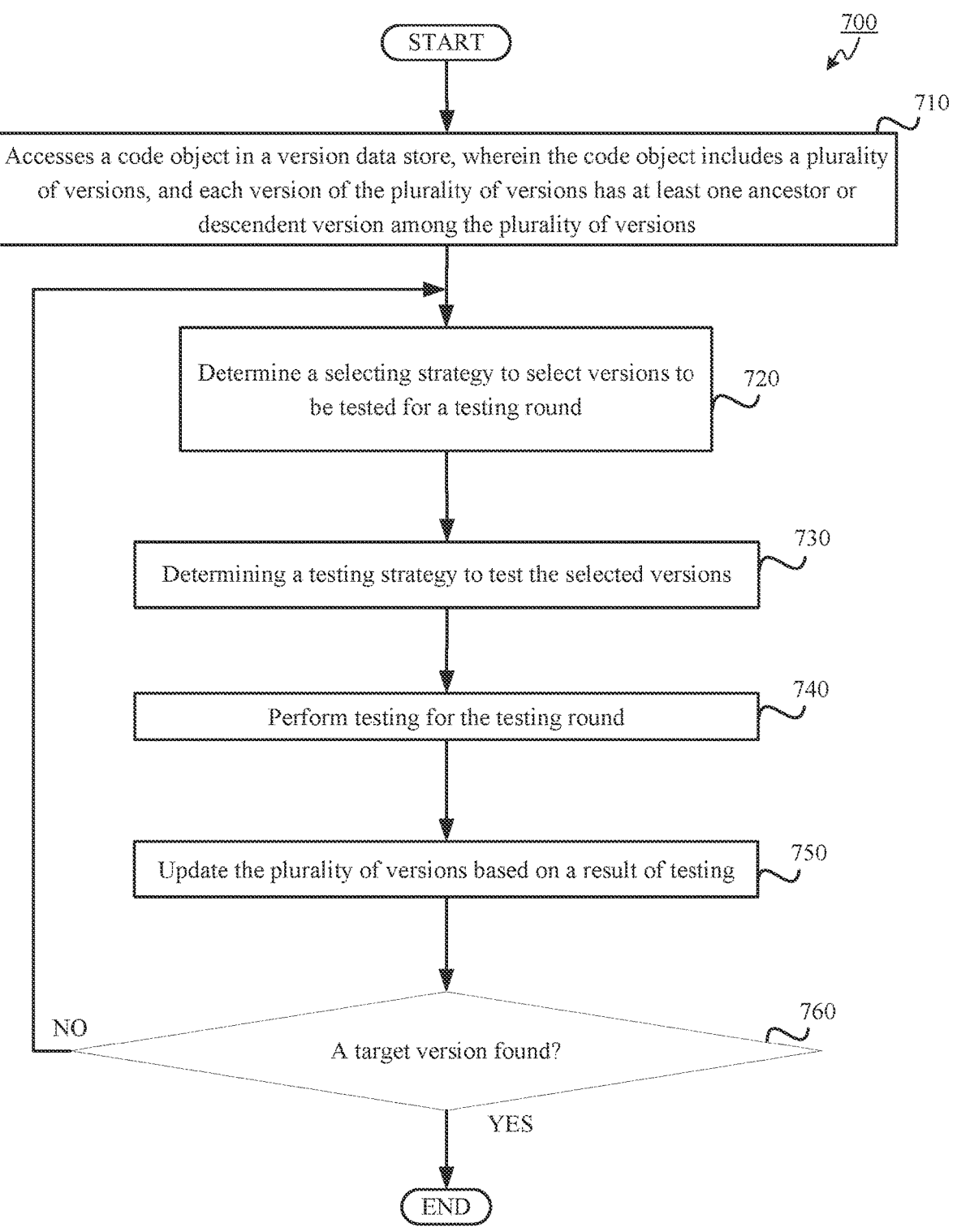
FIG. 7 depicts a flow diagram of an example method for smartly selecting and efficiently testing versions, in accordance with one or more aspects of the present disclosure.

FIG. 7 depicts a flow diagram of one illustrative example of a method 700 for storing test data and associating the test data with a change set for source code, in accordance with one or more aspects of the present disclosure. Method 700 may be similar to method 300, 500 and each of its individual functions, routines, subroutines, or operations may be performed by one or more processors of the computing device executing the method. Method 700 may be performed by processing devices of a server device or a client device.

At operation 710, a processing device may access source code in a version data store, wherein the code object includes a set of versions, and each version of the plurality of versions has at least one ancestor or descendent version among the plurality of versions. The operation 710 can be same as or similar to operation 310 and/or operation 510. Initially, the set of versions are the versions for consideration.

At operation 720, the processing device may determine a selecting strategy to select versions to be tested in a testing round. In some implementations, the selecting strategy may be the strategy illustrated in method 300, including operations 330-350, or additionally operation 320. In some implementations, the selecting strategy may use the weight criterion illustrated in method 300 in a different way as long as selecting would make the process more efficient.

At operation 730, the processing device may determine a testing strategy to test the selected versions. In some implementations, the testing strategy may be the strategy illustrated in method 500, including operations 540-570, or additionally operations 520 and/or 530. In some implementations, the testing strategy may use the parallel testing illustrated in method 500 in a different way as long as testing would make the process more efficient.

At operation 740, the processing device may test versions for the testing round, which can be same as or similar to operation 360 and/or operation 540. At operation 750, the processing device may update the versions for consideration based on the testing result for the testing round, which can be same as or similar to operation 370 and/or operation 570. At operation 760, the processing device may determine whether the target version has been found. Responsive to determining the target version has not been found, the processing device may start a new testing round. For example, the processing device may start the new testing round by determining a new selecting strategy at operation 720 and/or a new testing strategy at operation 730. In another example, the processing device may start the new testing round by using the previously determined selecting strategy and/or testing strategy to test versions at operation 740. The process continues until a target version is found.

Figure 8:
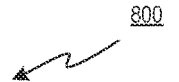
FIG. 8 depicts a block diagram of an example computer system in accordance with one or more aspects of the present disclosure.

FIG. 8 depicts a block diagram of a computer system 800 operating in accordance with one or more aspects of the present disclosure. Computer system 800 may be the same or similar to computer system 800 and may include one or more processing devices and one or more memory devices. In the example shown, computer system 800 may include a code object access module 810, a test configuration module 820, a testing module 830, and a test data analysis module 840.

Code object access module 510 may enable a processing device to access a code object in a version data store. The version data store comprises a set of versions for the code object, and each version may have a change set applied to the code object. The code object may include source code and the change set may include at least one of an addition, a removal, or an update of a line of text of the source code. The change set may be a data structure that includes change data for updating the code object. The change data may include content data added to at least one version of the code object and position data that indicates a location in the code object to add the content data. The position data may be included in the change set structure but may be absent from any or all versions of the code object. In one example, the change set may be represented by a hash of the change data and the hash may be linked with the test data.

Test configuration module 820 may enable the processing device to determine a selecting strategy and/or a testing strategy, and other configurations for a testing environment. The processing device may determine the selecting/testing strategies or configure the testing environment before, during, or after initiating the test. The test environment may include one or more computing devices (e.g., nodes 130A-C) and may be updated to incorporate a version of the code object being tested.

Testing module 830 may enable the processing device to initiate, pause, terminate a test of the code object. Initiating a test may involve the processing device executing an operation that begins testing of the code object in a testing environment. Pausing a test may involve the processing device executing an operation that pauses testing of the code object in a testing environment. Terminating a test may involve the processing device executing an operation that ends testing of the code object in a testing environment.

Test data analysis module 840 may enable the processing device to analyze test data for the code object. The test data may include results of the test and the processing device may access the test data from a computing device executing the test, a computing device managing the execution of the test or from a data storage device that stores result of the test (e.g., log server). The code object may include a plurality of versions arranged on a plurality of branches and the change set may be incorporated into versions on at least two of the plurality of branches. The test data may be linked to the change set and associated with each version that incorporates the change set without being directly linked to the individual versions. The test data may also or alternatively include execution data and configuration data for the test of the code object. The execution data may be result of the test and the configuration data may be input for the test. The processing device may store the test data in the version data store and the version data store may be the same version data store that includes the code object being tested or may be a different version data store. In either example, the version data store may include multiple versions of the test data that are associated with the change set. The multiple versions of the test data may include a first version that includes result of the test on a first test configuration, a second version that includes result of the test on a second test configuration, and a third version that includes a combination of the results from the tests on the first and second test configurations.

Figure 9:
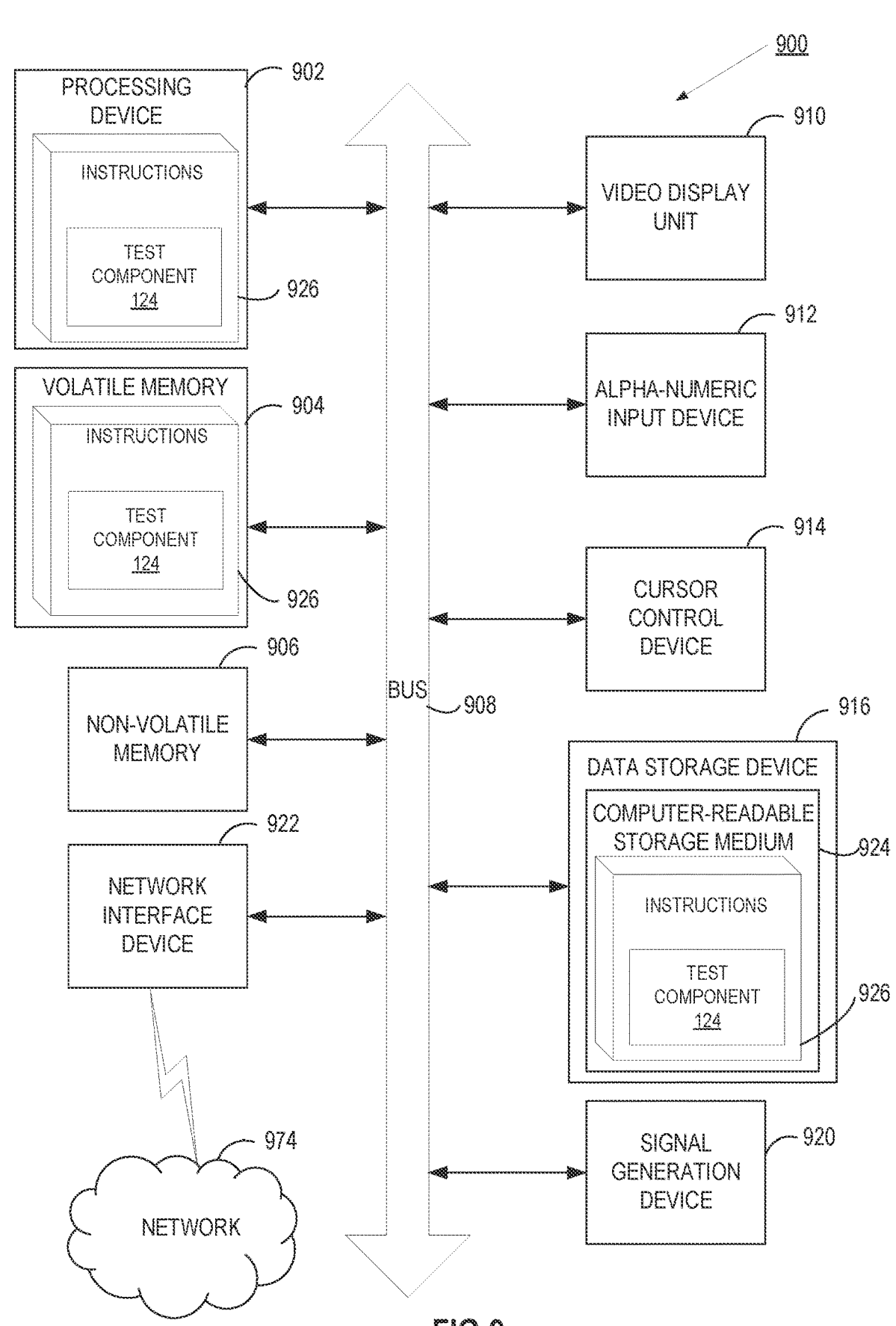
FIG. 9 depicts a block diagram of an illustrative computing device operating in accordance with the examples of the present disclosure.

FIG. 9 depicts a block diagram of a computer system operating in accordance with one or more aspects of the present disclosure. In various illustrative examples, computer system 900 may correspond to computing device 120 or one or more of the nodes 130A-Z of FIG. 1. Computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 300, 500, or 700 and for encoding test component 124 of FIGS. 1 and 2.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving a plurality of versions of one or more code objects, wherein each version of the plurality of versions has at least one ancestor or descendent version among the plurality of versions; determining a first number of versions in a testing round; selecting, from the plurality of versions, a first set of versions satisfying a weight-based criterion, wherein a number of the first set of versions equals the first number; testing the first set of versions; and updating the plurality of versions based on a result of testing the first set of versions.

Example 2 is a method of example 1, wherein selecting the first set of versions satisfying the weight-based criterion further comprises: assigning a weight to each version of the plurality of versions; calculating a first sum of the weights of the plurality of versions; calculating a first value based on the first sum and the first number; and selecting a first version of which a number of ancestor versions equals the first value.

Example 3 is a method of example 1, wherein the weight assigned to each version is based on a predetermined probability of a respective version being a target version.

Example 4 is a method of example 2, wherein selecting the first set of versions satisfying the weight-based criterion further comprises: forming a candidate pool including the plurality of versions; forming a test group; and responsive to selecting the first version of the plurality of versions, updating the test group by adding the first version to the test group and updating the candidate pool by removing, from the candidate pool, the first version and ancestor versions of the first version.

Example 5 is a method of example 4, wherein selecting first set of versions satisfying the weight-based criterion further comprises: calculating a second sum of the weights of versions in the updated candidate pool; calculating a second value based on the second sum and the first number; and selecting a second version of which a number of ancestor versions equals the second value.

Example 6 is a method of example 1, wherein selecting the first set of versions satisfying the weight-based criterion further comprises: incrementing a select count each time one version is selected; and determining whether the select count reaches the first number.

Example 7 is a method of example 6, wherein testing the first set of versions is performed responsive to determining that the select count reaches the first number.

Example 8 is a method of example 1, wherein the result of testing the first set of versions further comprises, for each version, at least one of: a positive result or a negative result.

Example 9 is a method of example 8, wherein updating the plurality of versions further comprises: responsive to a positive result of testing a second version of the plurality of versions, removing, from the plurality of versions, the second version and ancestor versions of the second version; and responsive to a negative result of testing a third version of the plurality of versions, removing, from the plurality of versions, descendent versions of the third version.

Example 10 is a method of example 1, further comprising: determining whether a target version has been found among the plurality of versions, responsive to determining that the target version has not been found among the plurality of versions; selecting, from the updated plurality of versions, a second set of versions based on a second weight criterion, wherein a number of the second set of versions equals the first number; testing the second set of versions; and updating the plurality of versions based on a result of testing the second set of versions.

Example 11 is a system comprising: a memory; and a processing device executing a hypervisor and operatively coupled to the memory, the processing device configured to perform operations comprising: receiving a plurality of versions of one or more code objects, wherein each version of the plurality of versions has at least one ancestor or descendent version among the plurality of versions; determining a first number of versions in a testing round; selecting, from the plurality of versions, a first set of versions satisfying a weight-based criterion, wherein a number of the first set of versions equals the first number; testing the first set of versions; and updating the plurality of versions based on a result of testing the first set of versions.

Example 12 is a system of example 11, wherein selecting the first set of versions satisfying the weight-based criterion further comprises: assigning a weight to each version of the plurality of versions; calculating a first sum of the weights of the plurality of versions; calculating a first value based on the first sum and the first number; and selecting a first version of which a number of ancestor versions equals the first value.

Example 13 is a system of example 11, wherein the weight assigned to each version is based on a predetermined probability of a respective version being a target version.

Example 14 is a system of example 12, wherein selecting the first set of versions satisfying the weight-based criterion further comprises: forming a candidate pool including the plurality of versions; forming a test group; and responsive to selecting the first version of the plurality of versions, updating the test group by adding the first version to the test group and updating the candidate pool by removing, from the candidate pool, the first version and ancestor versions of the first version.

Example 15 is a system of example 14, wherein selecting first set of versions satisfying the weight-based criterion further comprises: calculating a second sum of the weights of versions in the updated candidate pool; calculating a second value based on the second sum and the first number; and selecting a second version of which a number of ancestor versions equals the second value.

Example 16 is a system of example 11, wherein selecting the first set of versions satisfying the weight-based criterion further comprises: incrementing a select count each time one version is selected; and determining whether the select count reaches the first number.

Example 17 is a system of example 16, wherein testing the first set of versions is performed responsive to determining that the select count reaches the first number.

Example 18 is a system of example 11, wherein the result of testing the first set of versions further comprises, for each version, at least one of: a positive result or a negative result.

Example 19 is a system of example 18, wherein updating the plurality of versions further comprises: responsive to a positive result of testing a second version of the plurality of versions, removing, from the plurality of versions, the second version and ancestor versions of the second version; and responsive to a negative result of testing a third version of the plurality of versions, removing, from the plurality of versions, descendent versions of the third version.

Example 20 is a system of example 11, wherein the processing device is to perform operations further comprising: determining whether a target version has been found among the plurality of versions, responsive to determining that the target version has not been found among the plurality of versions; selecting, from the updated plurality of versions, a second set of versions based on a second weight criterion, wherein a number of the second set of versions equals the first number; testing the second set of versions; and updating the plurality of versions based on a result of testing the second set of versions.

Example 21 is a non-transitory machine-readable storage medium storing instructions which, when executed, cause a processing device executing a hypervisor to perform operations comprising: receiving a plurality of versions of one or more code objects, wherein each version of the plurality of versions has at least one ancestor or descendent version among the plurality of versions; determining a first number of versions in a testing round; selecting, from the plurality of versions, a first set of versions satisfying a weight-based criterion, wherein a number of the first set of versions equals the first number; testing the first set of versions; and updating the plurality of versions based on a result of testing the first set of versions.

Example 22 is a non-transitory machine-readable storage medium of example 21, wherein selecting the first set of versions satisfying the weight-based criterion further comprises: assigning a weight to each version of the plurality of versions; calculating a first sum of the weights of the plurality of versions; calculating a first value based on the first sum and the first number; and selecting a first version of which a number of ancestor versions equals the first value.

Example 23 is a non-transitory machine-readable storage medium of example 21, wherein the weight assigned to each version is based on a predetermined probability of a respective version being a target version.

Example 24 is a non-transitory machine-readable storage medium of example 22, wherein selecting the first set of versions satisfying the weight-based criterion further comprises: forming a candidate pool including the plurality of versions; forming a test group; and responsive to selecting the first version of the plurality of versions, updating the test group by adding the first version to the test group and updating the candidate pool by removing, from the candidate pool, the first version and ancestor versions of the first version.

Example 25 is a non-transitory machine-readable storage medium of example 24, wherein selecting first set of versions satisfying the weight-based criterion further comprises: calculating a second sum of the weights of versions in the updated candidate pool; calculating a second value based on the second sum and the first number; and selecting a second version of which a number of ancestor versions equals the second value.

Example 26 is a non-transitory machine-readable storage medium of example 21, wherein selecting the first set of versions satisfying the weight-based criterion further comprises: incrementing a select count each time one version is selected; and determining whether the select count reaches the first number.

Example 27 is a non-transitory machine-readable storage medium of example 26, wherein testing the first set of versions is performed responsive to determining that the select count reaches the first number.

Example 28 is a non-transitory machine-readable storage medium of example 21, wherein the result of testing the first set of versions further comprises, for each version, at least one of: a positive result or a negative result.

Example 29 is a non-transitory machine-readable storage medium of example 28, wherein updating the plurality of versions further comprises: responsive to a positive result of testing a second version of the plurality of versions, removing, from the plurality of versions, the second version and ancestor versions of the second version; and responsive to a negative result of testing a third version of the plurality of versions, removing, from the plurality of versions, descendent versions of the third version.

Example 30 is a non-transitory machine-readable storage medium of example 21, wherein the processing device is to perform operations further comprising: determining whether a target version has been found among the plurality of versions, responsive to determining that the target version has not been found among the plurality of versions; selecting, from the updated plurality of versions, a second set of versions based on a second weight criterion, wherein a number of the second set of versions equals the first number; testing the second set of versions; and updating the plurality of versions based on a result of testing the second set of versions.

Example 31 is a method comprising: receiving a plurality of versions of one or more code objects, wherein each version of the plurality of versions has at least one ancestor or descendent version among the plurality of versions; determining a first number of versions in a testing round; testing a first set of versions in parallel, wherein the first set of versions is selected from the plurality of versions; determining whether a first complete number equals the first number, wherein the first complete number is a number of a first complete set of versions, and the first complete set of versions is versions that have been tested and are among the first set of versions; and responsive to determining that the first complete number equals the first number, updating the plurality of versions based on a result of testing the first complete set of versions.

Example 32 is a method of example 31, wherein the first number is determined based on testing time.

Example 33 is a method of example 31, further comprising: determining a second number (R) of versions for testing in parallel.

Example 34 is a method of example 33, wherein the second number is determined based on at least one of: a number of testing rounds, testing time, or computing cost.

Example 35 is a method of example 33, further comprising: determining whether a first version of the first set of versions has been tested; responsive to determining that the first version has been tested, determining whether the number of versions tested is less than the first number; responsive to determining that the number of versions tested is less than the first number, testing a second version in parallel with rest of the first set of versions, the rest of the first set of versions being the first set of versions excluding the first version, wherein the second version is selected from the plurality of versions.

Example 36 is a method of example 31, further comprising: incrementing a test count each time one version is tested, wherein determining whether the first complete number equals the first number further comprises: determining whether the test count reaches the first number.

Example 37 is a method of example 31, wherein the result of testing the first complete set of versions further comprises, for each version, at least one of: a positive result or a negative result.

Example 38 is a method of example 31, wherein updating the plurality of versions further comprises: responsive to a positive result of testing a third version of the plurality of versions, removing, from the plurality of versions, the third version and ancestor versions of the third version; and responsive to a negative result of testing a fourth version of the plurality of versions, removing, from the plurality of versions, descendent versions of the fourth version.

Example 39 is a method of example 31, further comprising: determining whether a target version has been found among the plurality of versions, responsive to determining that the target version has not been found among the plurality of versions, testing a second set of versions in parallel, wherein the second set of versions is selected from the updated plurality of versions; determining whether a second complete number equals the first number, wherein the second complete number is a number of a second complete set of versions, and the second complete set of versions is versions that have been tested and are among the second set of versions; and responsive to determining that the second complete number equals the first number, updating the plurality of versions based on a result of testing the second complete set of versions.

Example 40 is a method of example 31, further comprising: determining whether a number of remaining versions in the updated plurality of versions is no more than a threshold value, responsive to determining that the number of remaining versions in the updated plurality of versions is more than the threshold value, testing a second set of versions in parallel, wherein the second set of versions is selected from the updated plurality of versions; determining whether a second complete number equals the first number, wherein the second complete number is a number of a second complete set of versions, and the second complete set of versions is versions that have been completely tested and are associated with the second set of versions; and responsive to determining that the second complete number equals the first number, updating the plurality of versions based on a result of testing the second complete set of versions.

Example 41 is a system comprising: a memory; and a processing device executing a hypervisor and operatively coupled to the memory, the processing device configured to perform operations comprising: receiving a plurality of versions of one or more code objects, wherein each version of the plurality of versions has at least one ancestor or descendent version among the plurality of versions; determining a first number of versions in a testing round; testing a first set of versions in parallel, wherein the first set of versions is selected from the plurality of versions; determining whether a first complete number equals the first number, wherein the first complete number is a number of a first complete set of versions, and the first complete set of versions is versions that have been tested and are among the first set of versions; and responsive to determining that the first complete number equals the first number, updating the plurality of versions based on a result of testing the first complete set of versions.

Example 42 is a system of example 41, wherein the first number is determined based on testing time.

Example 43 is a system of example 41, wherein the processing device is to perform operations further comprising: determining a second number (R) of versions for testing in parallel.

Example 44 is a system of example 43, wherein the second number is determined based on at least one of: a number of testing rounds, testing time, or computing cost.

Example 45 is a system of example 43, wherein the processing device is to perform operations further comprising: determining whether a first version of the first set of versions has been tested; responsive to determining that the first version has been tested, determining whether the number of versions tested is less than the first number; responsive to determining that the number of versions tested is less than the first number, testing a second version in parallel with rest of the first set of versions, the rest of the first set of versions being the first set of versions excluding the first version, wherein the second version is selected from the plurality of versions.

Example 46 is a system of example 41, wherein the processing device is to perform operations further comprising: incrementing a test count each time one version is tested, wherein determining whether the first complete number equals the first number further comprises: determining whether the test count reaches the first number.

Example 47 is a system of example 41, wherein the result of testing the first complete set of versions further comprises, for each version, at least one of: a positive result or a negative result.

Example 48 is a system of example 41, wherein updating the plurality of versions further comprises: responsive to a positive result of testing a third version of the plurality of versions, removing, from the plurality of versions, the third version and ancestor versions of the third version; and responsive to a negative result of testing a fourth version of the plurality of versions, removing, from the plurality of versions, descendent versions of the fourth version.

Example 49 is a system of example 41, wherein the processing device is to perform operations further comprising: determining whether a target version has been found among the plurality of versions, responsive to determining that the target version has not been found among the plurality of versions, testing a second set of versions in parallel, wherein the second set of versions is selected from the updated plurality of versions; determining whether a second complete number equals the first number, wherein the second complete number is a number of a second complete set of versions, and the second complete set of versions is versions that have been tested and are among the second set of versions; and responsive to determining that the second complete number equals the first number, updating the plurality of versions based on a result of testing the second complete set of versions.

Example 50 is a system of example 41, wherein the processing device is to perform operations further comprising: determining whether a number of remaining versions in the updated plurality of versions is no more than a threshold value, responsive to determining that the number of remaining versions in the updated plurality of versions is more than the threshold value, testing a second set of versions in parallel, wherein the second set of versions is selected from the updated plurality of versions; determining whether a second complete number equals the first number, wherein the second complete number is a number of a second complete set of versions, and the second complete set of versions is versions that have been completely tested and are associated with the second set of versions; and responsive to determining that the second complete number equals the first number, updating the plurality of versions based on a result of testing the second complete set of versions.

Example 51 is a non-transitory machine-readable storage medium storing instructions which, when executed, cause a processing device executing a hypervisor to perform operations comprising: receiving a plurality of versions of one or more code objects, wherein each version of the plurality of versions has at least one ancestor or descendent version among the plurality of versions; determining a first number of versions in a testing round; testing a first set of versions in parallel, wherein the first set of versions is selected from the plurality of versions; determining whether a first complete number equals the first number, wherein the first complete number is a number of a first complete set of versions, and the first complete set of versions is versions that have been tested and are among the first set of versions; and responsive to determining that the first complete number equals the first number, updating the plurality of versions based on a result of testing the first complete set of versions.

Example 52 is a non-transitory machine-readable storage medium of example 51, wherein the first number is determined based on testing time.

Example 53 is a non-transitory machine-readable storage medium of example 51, wherein the processing device is to perform operations further comprising: determining a second number (R) of versions for testing in parallel.

Example 54 is a non-transitory machine-readable storage medium of example 53, wherein the second number is determined based on at least one of: a number of testing rounds, testing time, or computing cost.

Example 55 is a non-transitory machine-readable storage medium of example 53, wherein the processing device is to perform operations further comprising: determining whether a first version of the first set of versions has been tested; responsive to determining that the first version has been tested, determining whether the number of versions tested is less than the first number; responsive to determining that the number of versions tested is less than the first number, testing a second version in parallel with rest of the first set of versions, the rest of the first set of versions being the first set of versions excluding the first version, wherein the second version is selected from the plurality of versions.

Example 56 is a non-transitory machine-readable storage medium of example 51, wherein the processing device is to perform operations further comprising: incrementing a test count each time one version is tested, wherein determining whether the first complete number equals the first number further comprises: determining whether the test count reaches the first number.

Example 57 is a non-transitory machine-readable storage medium of example 51, wherein the result of testing the first complete set of versions further comprises, for each version, at least one of: a positive result or a negative result.

Example 58 is a non-transitory machine-readable storage medium of example 51, wherein updating the plurality of versions further comprises: responsive to a positive result of testing a third version of the plurality of versions, removing, from the plurality of versions, the third version and ancestor versions of the third version; and responsive to a negative result of testing a fourth version of the plurality of versions, removing, from the plurality of versions, descendent versions of the fourth version.

Example 59 is a non-transitory machine-readable storage medium of example 51, wherein the processing device is to perform operations further comprising: determining whether a target version has been found among the plurality of versions, responsive to determining that the target version has not been found among the plurality of versions, testing a second set of versions in parallel, wherein the second set of versions is selected from the updated plurality of versions; determining whether a second complete number equals the first number, wherein the second complete number is a number of a second complete set of versions, and the second complete set of versions is versions that have been tested and are among the second set of versions; and responsive to determining that the second complete number equals the first number, updating the plurality of versions based on a result of testing the second complete set of versions.

Example 60 is a non-transitory machine-readable storage medium of example 51, wherein the processing device is to perform operations further comprising: determining whether a number of remaining versions in the updated plurality of versions is no more than a threshold value, responsive to determining that the number of remaining versions in the updated plurality of versions is more than the threshold value, testing a second set of versions in parallel, wherein the second set of versions is selected from the updated plurality of versions; determining whether a second complete number equals the first number, wherein the second complete number is a number of a second complete set of versions, and the second complete set of versions is versions that have been completely tested and are associated with the second set of versions; and responsive to determining that the second complete number equals the first number, updating the plurality of versions based on a result of testing the second complete set of versions.

Example 61 is a method comprising: receiving a plurality of versions of one or more code objects, each version of the plurality of versions has at least one ancestor or descendent version among the plurality of versions; selecting a select set of versions of the plurality of versions satisfying a weight-based criterion; testing a test set of versions of the plurality of versions in parallel; and updating the plurality of versions based on a result of testing the test set of versions.

Example 62 is a method of example 61, further comprising: determining a first select number of versions in a testing round, wherein a number of the first select set of versions equals the first select number.

Example 63 is a method of example 61, wherein selecting the select set of versions satisfying the weight-based criterion further comprises: assigning a weight to each version of the plurality of versions; calculating a first sum of the weights of the plurality of versions; calculating a first value based on the first sum and the first number; and selecting a first version of which a number of ancestor versions equals the first value.

Example 64 is a method of example 61, wherein the weight assigned to each version is based on a predetermined probability of a respective version being a target version.

Example 65 is a method of example 63, wherein selecting the first select set of versions satisfying the weight-based criterion further comprises: forming a candidate pool including the plurality of versions; forming a test group; and responsive to selecting the first version of the plurality of versions, updating the test group by adding the first version to the test group and updating the candidate pool by removing, from the candidate pool, the first version and ancestor versions of the first version.

Example 66 is a method of example 65, wherein selecting first select set of versions satisfying the weight-based criterion further comprises: calculating a second sum of the weights of versions in the updated candidate pool; calculating a second value based on the second sum and the first number; and selecting a second version of which a number of ancestor versions equals the second value.

Example 67 is a method of example 61, further comprising: determining a first test number of versions in a testing round.

Example 68 is a method of example 67, further comprising: determining whether a first complete number equals the first test number, wherein the first complete number is a number of a first complete set of versions, and the first complete set of versions is versions that have been tested and are among the first set of versions; and responsive to determining that the first complete number equals the first test number, updating the plurality of versions based on a result of testing the first complete set of versions.

Example 69 is a method of example 67, wherein the first test number is determined based on testing time.

Example 69 is a method of example 61, further comprising: determining a second number (R) of versions for testing in parallel.

Example 70 is a method of example 69, wherein the second number is determined based on at least one of: a number of testing rounds, testing time, or computing cost.

Example 71 is a method of example 61, wherein the result of testing the test set of versions further comprises, for each version, at least one of: a positive result or a negative result.

Example 72 is a method of example 61, wherein updating the plurality of versions further comprises: responsive to a positive result of testing a third version of the plurality of versions, removing, from the plurality of versions, the third version and ancestor versions of the third version; and responsive to a negative result of testing a fourth version of the plurality of versions, removing, from the plurality of versions, descendent versions of the fourth version.

Example 73 is a method of example 61, further comprising: determining whether a target version has been found among the plurality of versions, responsive to determining that the target version has not been found among the plurality of versions, selecting a second select set of versions of the updated plurality of versions satisfying the weight-based criterion; testing a second test set of versions of the updated plurality of versions in parallel; and updating the updated plurality of versions based on a result of testing the second test set of versions.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "generating," "accessing," "comparing," "indicating," "analyzing," "detecting," "providing," "transmitting," "updating," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 500, 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving, by a processing device, a plurality of versions of one or more code objects, wherein each version of the plurality of versions has at least one ancestor or descendent version among the plurality of versions;

determining a first number of versions in a testing round;

selecting, from the plurality of versions, a first set of versions satisfying a weight-based criterion, the first set of versions including a version from a first branch and a version from a second branch, wherein a number of the first set of versions equals the first number, wherein selecting the first set of versions satisfying the weight-based criterion comprises:

assigning a weight to each version of the plurality of versions;

calculating a first sum of the weights of the plurality of versions;

calculating a first value based on the first sum and the first number; and selecting a first version having a number of ancestor versions equal to the first value;

testing the first set of versions; and updating the version from the first branch and the version from the second branch based on a result of testing the first set of versions.

2. The method of claim 1, wherein the weight assigned to each version is based on a predetermined probability of a respective version being a target version.

3. The method of claim 1, wherein selecting the first set of versions satisfying the weight-based criterion further comprises:

forming a candidate pool including the plurality of versions;

forming a test group; and responsive to selecting the first version of the plurality of versions, updating the test group by adding the first version to the test group and updating the candidate pool by removing, from the candidate pool, the first version and ancestor versions of the first version.

4. The method of claim 3, wherein selecting the first set of versions satisfying the weight-based criterion further comprises:

calculating a second sum of the weights of versions in the updated candidate pool;

calculating a second value based on the second sum and the first number; and selecting a second version having a number of ancestor versions equal to the second value.

5. The method of claim 1, wherein selecting the first set of versions satisfying the weight-based criterion further comprises:

incrementing a select count each time one version is selected; and determining whether the select count reaches the first number.

6. The method of claim 5, wherein testing the first set of versions is performed responsive to determining that the select count reaches the first number.

7. The method of claim 1, wherein the result of testing the first set of versions further comprises, for each version, at least one of: a positive result or a negative result.

8. The method of claim 7, wherein updating the version from the first branch and the version from the second branch further comprises:

responsive to receiving the positive result of testing a second version of the plurality of versions, removing, from the plurality of versions, the second version and ancestor versions of the second version; and responsive to receiving the negative result of testing a third version of the plurality of versions, removing, from the plurality of versions, descendent versions of the third version.

9. The method of claim 1, further comprising:

determining whether a target version has been found among the plurality of versions; and responsive to determining that the target version has not been found among the plurality of versions:

selecting, from the plurality of versions, a second set of versions based on a second weight criterion, wherein a second number of the second set of versions equals the first number;

testing the second set of versions; and updating the plurality of versions based on a second result of testing the second set of versions.

10. A system comprising:

a memory; and a processing device communicably coupled to the memory, the processing device configured to perform operations comprising:

receiving a plurality of versions of one or more code objects, wherein each version of the plurality of versions has at least one ancestor or descendent version among the plurality of versions;

determining a first select number of versions in a testing round;

selecting, from the plurality of versions, a first set of versions satisfying a weight-based criterion, the first set of versions including a version from a first branch and a version from a second branch, wherein a number of the first set of versions equals the first select number, wherein, selecting the first set of versions satisfying the weight-based criterion comprises:

assigning a weight to each version of the plurality of versions;

calculating a first sum of the weights of the plurality of versions;

calculating a first value based on the first sum and the first select number; and selecting a first version having a number of ancestor versions equal to the first value;

testing the first set of versions; and updating the version from the first branch and the version from the second branch based on a result of testing the first set of versions.

11. The system of claim 10, wherein the weight assigned to each version is based on a predetermined probability of a respective version being a target version.

12. The system of claim 10, wherein selecting the first set of versions satisfying the weight-based criterion further comprises:

forming a candidate pool including the plurality of versions;

forming a test group; and responsive to selecting the first version of the plurality of versions, updating the test group by adding the first version to the test group and updating the candidate pool by removing, from the candidate pool, the first version and ancestor versions of the first version.

13. The system of claim 10, wherein testing the first set of versions further comprises:

determining a first test number of versions in a testing round;

testing the first set of versions in parallel;

determining whether a first complete number equals the first test number, wherein the first complete number is equal to a first complete set of versions, the first complete set of versions being versions that have been tested and are among the first set of versions; and responsive to determining that the first complete number equals the first test number, updating the version from the first branch and the version from the second branch based on the result of testing the first complete set of versions.

14. The system of claim 13, wherein the first test number is determined based on testing time.

15. The system of claim 10, wherein the processing device is to perform operations further comprising:

determining a second number of versions for testing in parallel, wherein the second number is determined based on at least one of: a number of testing rounds, testing time, or computing cost.

16. The system of claim 10, wherein updating the version from the first branch and the version from the second branch further comprises:

responsive to receiving a positive result of testing a second version of the plurality of versions, removing, from the plurality of versions, the second version and ancestor versions of the second version; and responsive to receiving a negative result of testing a third version of the plurality of versions, removing, from the plurality of versions, descendent versions of the third version.

17. The system of claim 10, wherein the processing device is to perform operations further comprising:

determining whether a target version has been found among the plurality of versions; and responsive to determining that the target version has not been found among the plurality of versions:

selecting, from the plurality of versions, a second set of versions based on a second weight criterion, wherein a number of the second set of versions equals the first select number;

testing the second set of versions; and updating the plurality of versions based on a result of testing the second set of versions.

18. A non-transitory machine-readable storage medium comprising instructions that cause a processing device to:

receive a plurality of versions of one or more code objects, wherein each version of the plurality of versions has at least one ancestor or descendent version among the plurality of versions;

determine a first number of versions in a testing round;

select, from the plurality of versions, a first set of versions satisfying a weight-based criterion, the first set of versions including a version from a first branch and a version from a second branch, wherein a number of the first set of versions equals the first number, wherein, to select the first set of versions satisfying the weight-based criterion, the processing device is to:

assign a weight to each version of the plurality of versions;

calculate a first sum of the weights of the plurality of versions;

calculate a first value based on the first sum and the first number; and select a first version having a number of ancestor versions equal to the first value;

test the first set of versions; and update the version from the first branch and the version from the second branch based on a result of testing the first set of versions.

* * * * *